(12) United States Patent
Dreyer et al.

(10) Patent No.: US 7,278,094 B1
(45) Date of Patent: Oct. 2, 2007

(54) VARIABLE TEXT PROCESSING FOR AN ELECTRONIC PRESS

(75) Inventors: Mark G. Dreyer, Aurora, IL (US); James L. Warmus, LaGrange, IL (US)

(73) Assignee: R. R. Donnelley & Sons Co., Chicago, IL (US)

( * ) Notice: Subject to any disclaimer, the term of this patent is extended or adjusted under 35 U.S.C. 154(b) by 0 days.

(21) Appl. No.: 09/563,882

(22) Filed: May 3, 2000

(51) Int. Cl.
*G06N 3/00* (2006.01)
(52) U.S. Cl. ..................................... 715/513
(58) Field of Classification Search ................ 715/513, 715/517, 520, 522, 523, 530; 709/223; 707/202
See application file for complete search history.

(56) References Cited

U.S. PATENT DOCUMENTS

| | | | |
|---|---|---|---|
| 2,761,789 A | 9/1956 | Locher et al. .................. | 8/562 |
| 3,549,055 A | 12/1970 | Gatland ....................... | 222/182 |
| 3,582,621 A | 6/1971 | Lawler | |
| 3,608,888 A | 9/1971 | McCain | |
| 3,774,758 A | 11/1973 | Sternberg | |
| 3,774,901 A | 11/1973 | McCain et al. | |
| 3,809,385 A | 5/1974 | Rana | |
| 3,819,173 A | 6/1974 | Anderson et al. | |
| 3,872,460 A | 3/1975 | Fredrickson et al. .. | 340/324 AD |
| 3,891,492 A | 6/1975 | Watson | |
| 3,892,427 A | 7/1975 | Kraynak et al. | |
| 3,899,165 A | 8/1975 | Abram et al. .................. | 270/54 |
| 3,932,744 A | 1/1976 | Anderson | |
| 3,953,017 A | 4/1976 | Wise | |
| 3,982,744 A | 9/1976 | Kraynak et al. ............... | 270/12 |
| 4,022,455 A | 5/1977 | Newsome et al. | |
| 4,085,455 A | 4/1978 | Okumura ..................... | 365/112 |
| 4,095,780 A | 6/1978 | Gasper et al. ................. | 270/73 |
| 4,117,975 A | 10/1978 | Gunn | |
| 4,121,818 A | 10/1978 | Riley et al. ................... | 270/54 |
| 4,168,776 A | 9/1979 | Hoeber | |
| 4,168,828 A | 9/1979 | McLear | |

(Continued)

FOREIGN PATENT DOCUMENTS

CA 2215094 4/1998

(Continued)

OTHER PUBLICATIONS

Kaufeld, John. "Paradox 5 for Windows for Dummies". 1994, IDG Books, pp. 11-13.*

(Continued)

*Primary Examiner*—Stephen Hong
*Assistant Examiner*—Kyle Stork
(74) *Attorney, Agent, or Firm*—McCracken & Frank LLP

(57) ABSTRACT

A software system is useful for generating a page file from a template file and database entries. The database entries are representative of variable information and the template file includes data designating a variable text area. The software system includes a computer-readable medium storing a software program having first, second, and third routines. The first routine associates the variable text area with a first text file that includes a variable information placeholder, while the second routine derives a second text file from the first text file in accordance with the variable information placeholder and at least one of the database entries. The third routine then generates the page file from the template file and the second text file.

46 Claims, 12 Drawing Sheets

U.S. PATENT DOCUMENTS

| | | |
|---|---|---|
| 4,247,008 A | 1/1981 | Dobbs |
| 4,338,768 A | 7/1982 | Ballestrazzi et al. |
| 4,345,276 A | 8/1982 | Colomb .................... 358/410 |
| 4,346,446 A | 8/1982 | Erbstein et al. |
| 4,395,031 A | 7/1983 | Gruber et al. ................ 270/54 |
| 4,413,724 A | 11/1983 | Fellner |
| 4,417,322 A | 11/1983 | Berry et al. |
| 4,417,630 A | 11/1983 | Weber et al. ................... 177/1 |
| 4,426,072 A | 1/1984 | Cole et al. .................... 270/53 |
| 4,441,829 A | 4/1984 | Hebert, Jr. et al. |
| 4,445,795 A | 5/1984 | Levine et al. |
| 4,482,142 A | 11/1984 | McCain et al. |
| 4,483,526 A | 11/1984 | Bulka et al. |
| 4,484,733 A | 11/1984 | Loos et al. |
| 4,495,582 A | 1/1985 | Dessert et al. .............. 364/469 |
| 4,499,545 A | 2/1985 | Daniels et al. |
| 4,500,083 A | 2/1985 | Wong ........................ 270/54 |
| 4,516,209 A | 5/1985 | Scribner |
| 4,517,637 A | 5/1985 | Cassell |
| 4,519,598 A | 5/1985 | McCain et al. |
| 4,520,454 A | 5/1985 | Dufour et al. ............. 358/1.18 |
| 4,536,176 A | 8/1985 | Gaspar ....................... 493/365 |
| 4,537,342 A | 8/1985 | McCain et al. |
| 4,552,349 A | 11/1985 | Loos et al. |
| 4,554,044 A | 11/1985 | Gaspar et al. .............. 156/510 |
| 4,556,595 A | 12/1985 | Ochi |
| 4,567,988 A | 2/1986 | Weibel |
| 4,601,003 A | 7/1986 | Yoneyama et al. ......... 364/518 |
| 4,601,394 A | 7/1986 | Hutner |
| 4,616,327 A | 10/1986 | Rosewarne et al. |
| 4,639,873 A | 1/1987 | Baggarly et al. |
| 4,665,555 A | 5/1987 | Alker et al. ................ 382/305 |
| 4,672,462 A | 6/1987 | Yamada ..................... 358/280 |
| 4,674,052 A | 6/1987 | Wong et al. ................ 364/466 |
| 4,677,571 A | 6/1987 | Riseman et al. |
| 4,710,886 A | 12/1987 | Heath ........................ 358/1.18 |
| 4,718,784 A | 1/1988 | Drisko ......................... 400/68 |
| 4,723,209 A | 2/1988 | Hernandez et al. ......... 715/521 |
| 4,727,402 A | 2/1988 | Smith ..................... 355/14 SH |
| 4,729,037 A | 3/1988 | Doelves ..................... 355/299 |
| 4,734,865 A | 3/1988 | Scullion et al. |
| RE32,690 E | 6/1988 | Wong ........................ 270/54 |
| 4,768,766 A | 9/1988 | Berger et al. |
| 4,789,147 A | 12/1988 | Berger et al. |
| 4,800,505 A | 1/1989 | Axelrod et al. |
| 4,800,506 A | 1/1989 | Axelrod et al. ............. 700/227 |
| 4,800,510 A | 1/1989 | Vinberg et al. |
| 4,827,315 A | 5/1989 | Woldberg et al. ........... 346/160 |
| 4,866,628 A | 9/1989 | Natarajan |
| 4,900,001 A | 2/1990 | Lapeyre ..................... 270/1.1 |
| 4,903,139 A | 2/1990 | Minter ....................... 358/296 |
| 4,908,768 A | 3/1990 | Gelfer et al. |
| 4,910,612 A | 3/1990 | Yamazaki ................... 358/496 |
| 4,928,243 A | 5/1990 | Hodges et al. .............. 715/502 |
| 4,928,252 A | 5/1990 | Gabbe et al. ................ 364/519 |
| 4,930,077 A | 5/1990 | Fan |
| 4,933,880 A | 6/1990 | Borgendale et al. |
| 4,937,761 A | 6/1990 | Hassett ....................... 364/518 |
| 4,948,109 A | 8/1990 | Petersen |
| 4,949,272 A | 8/1990 | Vanourek et al. ........... 705/410 |
| 4,953,105 A | 8/1990 | Hirata et al. |
| 4,968,993 A | 11/1990 | Wolfberg et al. ........... 346/160 |
| 4,984,948 A | 1/1991 | Lindsay et al. |
| 5,001,500 A | 3/1991 | Wolfberg et al. ........... 346/160 |
| 5,005,124 A | 4/1991 | Connell et al. |
| 5,021,975 A | 6/1991 | Yamanashi ................. 364/519 |
| 5,025,396 A | 6/1991 | Parks et al. ................. 715/506 |
| 5,027,279 A | 6/1991 | Gottlieb et al. |
| 5,028,192 A | 7/1991 | Lindsay et al. |
| 5,031,891 A | 7/1991 | Kobler et al. |
| 5,033,009 A | 7/1991 | Dubnoff |
| 5,039,075 A | 8/1991 | Mayer |
| 5,043,749 A | 8/1991 | Punater et al. ........... 346/153.1 |
| 5,053,955 A | 10/1991 | Peach et al. .................. 705/14 |
| 5,054,984 A | 10/1991 | Chan et al. |
| 5,056,767 A | 10/1991 | Emigh et al. |
| 5,060,165 A | 10/1991 | Schumacher et al. ....... 700/213 |
| 5,067,024 A | 11/1991 | Anzai ........................ 358/296 |
| 5,068,797 A | 11/1991 | Sansone et al. |
| 5,072,397 A | 12/1991 | Barns-Slavin et al. |
| 5,072,401 A | 12/1991 | Sansone et al. |
| 5,077,694 A | 12/1991 | Sansone et al. .......... 707/104.1 |
| 5,085,470 A | 2/1992 | Peach et al. .................. 283/58 |
| 5,098,076 A | 3/1992 | Kelsey |
| 5,102,110 A | 4/1992 | Reynolds |
| 5,103,490 A | 4/1992 | McMillin .................... 382/284 |
| 5,105,283 A | 4/1992 | Forest et al. ................ 358/401 |
| 5,112,179 A | 5/1992 | Chan et al. .................... 412/1 |
| 5,114,128 A | 5/1992 | Harris, Jr et al. |
| 5,114,291 A | 5/1992 | Hefty |
| 5,119,306 A | 6/1992 | Metelits et al. |
| 5,133,051 A | 7/1992 | Handley |
| 5,134,669 A | 7/1992 | Keogh et al. ............... 382/318 |
| 5,136,316 A | 8/1992 | Punater et al. ........... 346/153.1 |
| 5,142,482 A | 8/1992 | Sansone ..................... 700/221 |
| 5,142,618 A | 8/1992 | Fujiwara et al. |
| 5,142,667 A | 8/1992 | Dimperio et al. ........... 395/115 |
| 5,143,362 A | 9/1992 | Doane et al. |
| 5,144,562 A | 9/1992 | Stikkelorum et al. ....... 364/478 |
| 5,157,765 A | 10/1992 | Birk et al. ................... 345/506 |
| 5,175,679 A | 12/1992 | Allen et al. ................... 700/28 |
| 5,177,877 A | 1/1993 | Duchesne et al. ............. 34/51 |
| 5,178,063 A | 1/1993 | Wolfberg et al. ............. 101/76 |
| 5,194,899 A | 3/1993 | Buchanan ................... 355/244 |
| 5,200,903 A | 4/1993 | Gilham |
| 5,202,206 A | 4/1993 | Tam ............................ 430/41 |
| 5,210,824 A | 5/1993 | Putz et al. |
| 5,220,420 A | 6/1993 | Hoarty et al. ............... 725/119 |
| 5,220,674 A * | 6/1993 | Morgan et al. ............. 709/223 |
| 5,220,770 A | 6/1993 | Szewczyk et al. |
| 5,229,932 A | 7/1993 | Connell et al. ................. 705/1 |
| 5,238,345 A | 8/1993 | D'Andrea ..................... 412/4 |
| 5,245,701 A | 9/1993 | Matsumoto ................. 395/129 |
| 5,257,196 A | 10/1993 | Sansone ..................... 705/403 |
| 5,267,155 A | 11/1993 | Buchanan et al. .......... 395/803 |
| 5,267,821 A | 12/1993 | Bodart et al. |
| 5,271,065 A | 12/1993 | Rourke et al. ................. 382/1 |
| 5,274,567 A | 12/1993 | Kallin et al. ................ 364/478 |
| 5,274,757 A | 12/1993 | Miyoshi et al. ............. 395/146 |
| 5,280,895 A | 1/1994 | Meier |
| 5,287,976 A | 2/1994 | Mayer et al. ................ 209/547 |
| 5,289,569 A | 2/1994 | Taniguchi ................... 395/787 |
| 5,291,243 A | 3/1994 | Heckman et al. .............. 399/3 |
| 5,293,310 A | 3/1994 | Carroll et al. |
| 5,295,236 A | 3/1994 | Bjorge et al. |
| 5,299,310 A | 3/1994 | Motoyama |
| 5,301,036 A | 4/1994 | Barrett et al. |
| 5,303,334 A | 4/1994 | Snyder et al. |
| 5,313,564 A | 5/1994 | Kafri et al. |
| 5,313,578 A | 5/1994 | Handorf ..................... 719/314 |
| 5,319,745 A | 6/1994 | Vinsonneau et al. ........ 715/515 |
| 5,321,604 A | 6/1994 | Peach et al. .................. 705/14 |
| 5,326,209 A | 7/1994 | Duke |
| 5,333,246 A | 7/1994 | Nagasaka |
| 5,337,246 A | 8/1994 | Carroll et al. |
| 5,337,258 A | 8/1994 | Dennis |
| 5,346,196 A | 9/1994 | Nussbaum et al. ....... 270/52.14 |
| 5,349,648 A | 9/1994 | Handley |
| 5,353,222 A | 10/1994 | Takise et al. ................ 395/793 |
| 5,353,388 A | 10/1994 | Motoyama ................. 358/1.18 |
| 5,359,423 A | 10/1994 | Loce |
| 5,359,432 A | 10/1994 | Peltzer et al. |
| 5,377,120 A | 12/1994 | Humes et al. |
| 5,379,368 A | 1/1995 | Imai et al. .................. 358/1.18 |

| | | | |
|---|---|---|---|
| 5,379,373 A | 1/1995 | Hayashi et al. ............. 395/774 |
| 5,381,523 A | 1/1995 | Hayashi |
| 5,383,129 A | 1/1995 | Farrell |
| 5,384,886 A | 1/1995 | Rourke ....................... 395/785 |
| 5,390,354 A | 2/1995 | De Heus et al. ............. 715/517 |
| 5,396,321 A | 3/1995 | McFarland et al. ......... 355/313 |
| 5,398,289 A | 3/1995 | Rourke et al. |
| 5,400,263 A | 3/1995 | Rohrbaugh et al. ............ 716/4 |
| 5,412,566 A | 5/1995 | Sawa ........................ 395/803 |
| 5,414,809 A | 5/1995 | Hogan et al. |
| 5,419,541 A | 5/1995 | Stevens ................... 270/52.19 |
| 5,422,992 A | 6/1995 | Motoyama et al. |
| 5,442,561 A | 8/1995 | Yoshizawa et al. |
| 5,442,737 A | 8/1995 | Smith |
| 5,444,630 A | 8/1995 | Dlugos |
| 5,446,653 A | 8/1995 | Miller et al. ................... 705/4 |
| 5,446,667 A | 8/1995 | Oh et al. |
| 5,455,945 A | 10/1995 | Vanderdrift .................... 707/2 |
| 5,459,819 A | 10/1995 | Watkins et al. |
| 5,459,826 A | 10/1995 | Archibald .................. 395/779 |
| 5,461,708 A | 10/1995 | Kahn |
| 5,465,213 A | 11/1995 | Ross |
| 5,473,741 A | 12/1995 | Neufelder |
| 5,483,624 A | 1/1996 | Christopher et al. ........ 358/1.18 |
| 5,493,490 A | 2/1996 | Johnson ...................... 395/226 |
| 5,500,928 A | 3/1996 | Cook et al. .................. 345/619 |
| 5,502,636 A | 3/1996 | Clarke ......................... 705/10 |
| 5,502,804 A | 3/1996 | Butterfield et al. |
| 5,505,697 A | 4/1996 | McKinnon, Jr. et al. ...... 604/71 |
| 5,506,697 A | 4/1996 | Li et al. ..................... 358/448 |
| 5,517,605 A | 5/1996 | Wolf |
| 5,519,624 A | 5/1996 | Hidding ...................... 700/213 |
| 5,523,942 A | 6/1996 | Tyler et al. .................... 705/4 |
| 5,530,852 A | 6/1996 | Meske, Jr. et al. ......... 707/206 |
| 5,535,677 A | 7/1996 | Fannin et al. ............... 101/486 |
| 5,544,287 A | 8/1996 | Roth ........................ 358/1.15 |
| 5,546,517 A | 8/1996 | Marks et al. |
| 5,550,928 A | 8/1996 | Lu et al. ..................... 382/116 |
| 5,552,994 A | 9/1996 | Cannon et al. ............... 100/95 |
| 5,553,212 A | 9/1996 | Eton et al. |
| 5,553,258 A | 9/1996 | Godiwala et al. |
| 5,555,094 A | 9/1996 | Lefebvre et al. |
| 5,557,722 A | 9/1996 | DeRose et al. |
| 5,563,999 A | 10/1996 | Yaksich et al. ............. 715/507 |
| 5,587,799 A | 12/1996 | Kawamura et al. |
| 5,592,683 A | 1/1997 | Chen et al. .................... 710/52 |
| 5,594,860 A | 1/1997 | Gauthier ..................... 395/501 |
| 5,594,910 A | 1/1997 | Filepp et al. |
| 5,611,024 A | 3/1997 | Campbell et al. .......... 385/1.15 |
| 5,625,766 A | 4/1997 | Kauffman |
| 5,628,004 A | 5/1997 | Gorinley et al. .......... 707/104.1 |
| 5,630,028 A | 5/1997 | DeMeo ....................... 395/110 |
| 5,634,091 A | 5/1997 | Sands et al. |
| 5,644,776 A | 7/1997 | DeRose et al. ............. 715/500 |
| 5,649,186 A | 7/1997 | Ferguson ..................... 707/10 |
| 5,669,005 A | 9/1997 | Curbow et al. |
| 5,671,345 A | 9/1997 | Lhotak |
| 5,689,718 A | 11/1997 | Sakurai et al. ............. 715/517 |
| 5,708,825 A | 1/1998 | Sotomayor ............... 785/501.1 |
| 5,708,826 A | 1/1998 | Ikeda et al. ............. 715/501.1 |
| 5,708,828 A | 1/1998 | Coleman .................... 715/523 |
| 5,710,635 A | 1/1998 | Webster et al. |
| 5,729,665 A | 3/1998 | Gauthier ..................... 395/117 |
| 5,745,121 A | 4/1998 | Politis |
| 5,745,360 A | 4/1998 | Leone et al. ................ 715/513 |
| 5,745,908 A | 4/1998 | Anderson et al. ........... 715/513 |
| 5,748,484 A | 5/1998 | Cannon et al. ............. 700/233 |
| 5,754,750 A | 5/1998 | Butterfield et al. ......... 345/418 |
| 5,754,766 A | 5/1998 | Shaw et al. ................. 709/200 |
| 5,758,361 A | 5/1998 | Van Hoff .................... 715/513 |
| 5,761,656 A * | 6/1998 | Ben-Shachar ................ 707/4 |
| 5,774,635 A | 6/1998 | Kumsisto et al. ........... 358/1.6 |
| 5,781,914 A | 7/1998 | Stork et al. ................. 715/506 |
| 5,794,259 A | 8/1998 | Kikinis ....................... 715/507 |
| 5,809,218 A | 9/1998 | Kastenholz et al. |
| 5,819,301 A | 10/1998 | Rowe et al. ................. 715/513 |
| 5,832,531 A | 11/1998 | Ayers ......................... 707/500 |
| 5,845,299 A | 12/1998 | Arora et al. ................. 715/513 |
| 5,872,640 A | 2/1999 | Cohen et al. ................ 358/434 |
| 5,890,175 A | 3/1999 | Wong et al. ................. 715/505 |
| 5,900,003 A | 5/1999 | Ben Dror .................... 715/517 |
| 5,907,836 A | 5/1999 | Sumita et al. .................. 707/2 |
| 5,924,092 A | 7/1999 | Johnson ......................... 707/7 |
| 5,924,109 A * | 7/1999 | Ackerman et al. .......... 715/531 |
| 5,937,153 A | 8/1999 | Gauthier |
| 5,960,164 A | 9/1999 | Dorfman et al. |
| 5,963,968 A | 10/1999 | Warmus et al. |
| 5,983,243 A | 11/1999 | Heiney et al. .............. 707/500 |
| 5,987,461 A | 11/1999 | Dreyer et al. |
| 6,026,433 A * | 2/2000 | D'Arlach et al. ........... 709/217 |
| 6,064,397 A | 5/2000 | Herregods et al. |
| 6,078,403 A * | 6/2000 | Palmer ...................... 358/1.18 |
| 6,151,603 A * | 11/2000 | Wolfe .......................... 707/10 |
| 6,199,070 B1 * | 3/2001 | Polo-Wood et al. ........ 707/202 |
| 6,336,124 B1 * | 1/2002 | Alam et al. ................. 715/523 |
| 6,442,576 B1 * | 8/2002 | Edelman et al. ............ 715/513 |

FOREIGN PATENT DOCUMENTS

| | | |
|---|---|---|
| CA | 2207840 | 12/1998 |
| DE | 69401435 | 2/1997 |
| EP | 0 119 720 | 9/1984 |
| EP | 0 602 547 | 6/1994 |
| EP | 0 703 524 A1 | 3/1996 |
| EP | 0 703 524 B1 | 1/1997 |
| EP | 0 837 401 | 4/1998 |
| JP | 8115178 | 5/1996 |
| JP | 11238053 | 8/1999 |
| WO | WO86/04703 | 8/1986 |
| WO | WO 95 07510 | 3/1995 |
| WO | WO95 07510 | 3/1995 |
| WO | WO 96/22573 | 7/1996 |
| WO | WO 97/18513 | 5/1997 |
| WO | WO 97/18514 | 5/1997 |
| WO | WO 99/63452 | 12/1999 |

OTHER PUBLICATIONS

Dieckmann, Glenn, "Press Imposition for IBM 4250, General Information," R.R. Donnelley & Sons Company, Crawfordsville Manufacturing Division, Department CHT, Feb. 21, 1989.

*Alpha Four, New Version 3,* "True Relational Database Power Without Programming, Reference Manual," Alpha Software Corporation, Lesson 20: Using Sets and Lesson 22: Advanced Sets: One-to-Many Links, 1993.

"Design Your Forms, Power With Room To Grow: Xbasic™" advertisement, DBMS Magazine, Sep. 1994.

Xeikon announcement, "Xeikon announces new RIP for the DCP-1 digital color press," Sep. 13, 1994.

"Finding the Right Niches for Electronic Printing," *The Seybold Report on Desktop Publishing*, Mar. 7, 1994, pp. 12-18.

Xeikon brochure, "Beta Specifications, Xeikon DCP-1 Digital Color Press," date unknown.

Barco Graphics brochure, "RIP and Electronic Collation System for Xeikon DCP-1 Digital Printing Press," Feb. 2, 1994, with Addendum 1.

European Search Report dated Jul. 22, 1999.

"Agfa's CR-A RIP varies data," *Seybold Special Report*, vol. 3, No. 2 (Oct. 10, 1994).

"Agfa poised to enter short-run color market. (Chromapress electrophotographic digital press system)," *MacWeek*, p. 18 (Oct. 31, 1994).

"Agfa Holds Expo, US Launch of ChromaPress Digital Printing," *Newsbytes News Network* (Nov. 4, 1994).

"The Latest Word," *The Seybold Report on Publishing Systems*, vol. 24, No. 6, (Nov. 30, 1994).

"Agfa Expo: the medium is the message," *The Seybold Report on Publishing Systems*, p. 17 (Nov. 30, 1994).

"The Latest Word: Chromapress varies data," *The Seybold Report on Publishing Systems*, p. 28 (Mar. 13, 1995).

"The Latest Word," *The Seybold Report on Publishing Systems*, vol. 24, No. 13, pp. 26-28 (Mar. 13, 1995).

"Digital Color Printing in Japan: A Report from Early Users," *The Seybold Report on Publishing Systems*, vol. 24, No. 13, pp. 13-19 (Mar. 13, 1995).

"Indigo Expands Digital Press Line to Packaging; Enhances E-Print 1000," *The Seybold Report on Publishing Systems*, vol. 24, No. 13, pp. 3-12 (Mar. 13, 1995).

"Variable-data and custom printing," *Seybold Special Report*, vol. 3, No. 8, pp. 63 and 64 (Apr. 21, 1995).

"Moore announces new digital printing strategy," *Seybold Special Report*, vol. 3, No. 8, p. 65 (Apr. 21, 1995).

"Agfa Let RIP with Gemini," *M2 Presswire* (Apr. 27, 1995).

"Company-by-Company Guide to the Show: Agfa-Gevaert," *The Seybold Report on Publishing Systems*, vol. 24, No. 17, p. 6 (May 1, 1995).

"Digital printers push customization," *The Seybold Report on Publishing Systems*, vol. 24, No. 19, pp. 10 and 11 (Jun. 12, 1995).

"Agfa 'distributes and prints,' adds new RIP," *The Seybold Report on Publishing Systems*, vol. 24, No. 20, pp. 8-10 (Jun. 26, 1995).

"Indigo System Developments: Indigo varies data, shows Mobius, Omnius," *The Seybold Report on Publishing Systems*, vol. 24, No. 20, pp. 12-15 (Jun. 26, 1995).

"Barco features PrintStreamer, TonerSaver," *Seybold Special Report*, vol. 24, No. 20, p. 11 (Jun. 26, 1995).

"Short-Run Digital Color Printing," *Seybold Special Report*, vol. 4, No. 2, pp. 33 and 34 (Oct. 23, 1995).

"T/R Systems set new price point for digital presses," *The Seybold Report on Publishing Systems*, p. 35 (Oct. 23, 1995).

"Color, Here and Now," *Printing Impressions*, p. 28 (Nov. 11, 1995).

"Digital presses eye the market of one," *Graphic Arts Monthly*, p. 42 (Apr. 1, 1996).

"The 'On Demand' Show: Exciting Technology-But Is the Market Ready?," *The Seybold Report on Publishing Systems*, vol. 25, No. 16, pp. 3, 5 and 6 (May 17, 1996).

"Indigo," *The Seybold Report on Publishing Systems*, vol. 25, No. 16, pp. 5 and 6 (May 17, 1996).

"Personalization for Indigo Engines," *The Seybold Report on Publishing Systems*, vol. 25, No. 22, pp. 9-13 (Aug. 26, 1996).

"Variable Data on Digital Presses: Making Progress," *The Seybold Report on Publishing Systems*, vol. 25, No. 22, pp. 3-8 (Aug. 26, 1996).

*Seybold Report on Publishing Systems*, vol. 25, No. 22, ISSN: 0736-7260, Aug. 26, 1996.

"Variable Postscript and the Coming of Age of Electronic Print-for-Profit," *Print on Demand Business*, May/Jun. 1996, pp. 64, 66-67.

"Variable-Data Printing Comes of Age: Capabilities & Market Demand Converge," *Seybold Report on Publishing Systems*, vol. 27, No. 2, Sep. 15, 1997, pp. 3-24.

"Indigo Variable Data Solution evaluation," Interoffice Memorandum from R.R. Donnelley & Sons Company dated Jul. 26, 1995 (portions redacted).

AGFA Internet Website: "Chromapress Software" (Oct. 30, 1998), URL: www.agfahome.com/printing/software.html.

AGFA Internet Website: "Digital Color Printing System: Personalizer-X v2.0, Variable Data Software for Chromapress" (Oct. 30, 1998), URL: www.agfahome.com/products/printing/software/personalizerx.html.

Atlas Internet Website: "PrintShop Mail" (Oct. 30, 1998), URL: www.atlassoftware.nl/products/psmail/psmail.html.

Atlas Internet Website: "Atlas Software Products" (Oct. 30, 1998), URL: www.atlassoftware.nl/products/products.html.

BARCO Graphics Internet Website: "Variable Information Printing" (Oct. 29, 1998), URL: www.barco.com/graphics/systems/vip/viphome.htm.

BARCO Graphics Internet Website: "BARCO Graphics VIP concept gives digital printing its true original dimension," URL: www.barco.com/graphics/press/pr178ife.htm (Oct. 29, 1998).

BARCO Graphics Internet Website: "BARCO Graphics wins Seybold Award for variable data," URL: www.barco.com/graphics/press/pr162ice.htm (Oct. 29, 1998).

BARCO Graphics Internet Website: "VIPDesigner Technical Specifications" (Oct. 29, 1998), URL: www.barco.com/graphics/data/vipdesigf.htm.

BITSTREAM Internet Website: "Application Products: PageFlex™" (Oct. 29, 1998), URL: www.bitstream.com/products/application/pageflex/index.html.

Colorage/Splash Internet Website: "Splash Technology, About Our Company," URL: www.colorage.com/company/about.html (Oct. 30, 1998).

Colorage/Splash Internet Website: "Splash Launches DocuPress Series of Servers for Xerox Midrange Digital Color Copiers" (Oct. 30, 1998), URL: www.colorage.com/company/press98/9803Mar2.html.

Document Sciences Corporation Internet Website: "Document Sciences Corporation", URL: www.xerox.com/alliance/psg/docsci.htm (Oct. 31, 1998).

Document Sciences Corporation Internet Website: "Products and Solutions," URL: www.docscience.com/product.htm (Oct. 31, 1998).

Document Sciences Corporation Internet Website: "Tomorrow's Technology is Today's Reality," URL: www.docuscience.com/products/compuset.htm (Oct. 31, 1998).

DPS Internet Website: "DataBase Publishing Software, About DPS" (Oct. 31, 1998), URL: www.databasepub.com/about.html.

DPS Internet Website: "Expert Publisher: Intelligent Automation" (Oct. 31, 1998), URL: www.databasepub.com/newpub.html.

DPS Internet Website, URL: www.databasepub.com/bottom.html (Oct. 31, 1998).

DPS Internet Website: "Applications," URL: www.databasepub.com/left.html (Oct. 31, 1998).

DPS Internet Website: "Catalog Genie Grants Wishes" (Oct. 31, 1998), URL: www.databasepub.com/catsoftware.html.

DPS Internet Website: "DPS Introduces Catalog Genie" (Oct. 31, 1998), URL: www.databasepubl.com/genie.html.

DPS Internet Website: "DPS Introduces New Release of Catalog Genie" (Oct. 31, 1998), URL: www.databasepub.com/genie2.html.

Elixir Internet Website: "Xerox to Distribute and Support Elixir's Opus (R) Worldwide," URL: www.elixirnt.elixir.com/nwsevnt. (Oct. 31, 1998).

Elixir Internet Website: "Elixir Products" (Oct. 31, 1998), URL: www.elixir.com/Products/products.htm.

Elixir Internet Website: "Opus," URL: www.elixir.com/Products/opus.htm (Oct. 31, 1998).

Elixir Internet Website: "DataMerge," URL: www.elixir.com/Products/dmerge.htm (Oct. 31, 1998).

Elixir Internet Website: "AppBuilder for AFP," URL: www.elixir.com/Products/appafp.htm (Oct. 31, 1998).

Elixir Internet Website: "AppBuilder for VIPP" (Oct. 31, 1998), URL:www.elixir.com/Products.appvipp.htm.

Em Software Internet Website: "Welcome to Em Software on the Web!" (Oct. 31, 1998), URL: www.emsoftware.com/.

Em Software Internet Website: "Em Software—Products" (Oct. 31, 1998), URL: www.emsoftware.com/products.html.

Group 1 Software Internet Website: "Group 1 Software: EZ-LETTER" (Oct. 31, 1998), URL: www.group1software.com/products/ds.asp.

Indigo Internet Website: "Yours Truly Software" (Oct. 29, 1998), URL: www.indigonet.com/yours_truly.htm.

Meadows Information Systems Internet Website: "About Meadows Information Systems, Inc.", URL: www.meadowsinfo.com/mishtml/meadows.htm (Oct. 27, 1998).

Meadows Information Systems Internet Website: "AutoPrice XTension to QuarkXPress by Meadows Information Systems", URL: www.meadowsinfo.com/mishtml/autopric.htm (Oct. 27, 1998).

Meadows Information Systems Internet Website: "DataMerge XTension to QuarkXPress by Meadows Information Systems", URL: www.meadowsinfo.com/mishtml/datamerg.htm (Oct. 27, 1998).
Meadows Information Systems Internet Website: "Group Picture XTension to QuarkXPress by Meadows Information Systems" (Oct. 27, 1998), URL: www.meadowsinfo.com/mishtml/grouppic.htm.
Scitex Internet Website: "Scitex Darwin Desktop 2.0 is Now Shipping," URL: www.scitex.com/press/english/darwin2.htm (Oct. 29, 1998).
T/R Systems Internet Website: "About T/R Systems" (Nov. 2, 1998), URL: www.trsystems.com/tr_docs/About.htm.
Varis Corporation Internet Website: "Varis Corporation and Scitex Digital Printing Announce World Wide Co-Marketing Agreement for High Speed Variable PostScript Printing," URL: www.variscorp.com/ns/ns.sci.html#pr (Nov. 2, 1998).
Varis Corporation Internet Website: "Redefining the process . . . VariScript Software," URL: www.variscorp.com/pro/text.html (Nov. 2, 1998).
Varis Corporation Internet Website: "Varis Corporation Unveils Unprecedented Products for Variable Print-On-Demand Market," URL: www.variscorp.com/ns/ns.pro.html#pr (Nov. 2, 1998).
Barco Graphics/IBM brochure: "Barco VIPDesigner Software for the IBM InfoColor 70 Printer" (1998).
Colorbus Advertisement: "There's One in Every Family," *DocuWorld*, Issue 1, vol. 2, p. 2 (1998).
DocuWorld Product Watch: "Authoring Tool for Variable Information Jobs," *DocuWorld*, Issue 1, vol. 2, p. 72 (1998).
Drennan, Bill, et al., "Xerox offers programming language," *The Seybold Report on Publishing Systems*, vol. 27, No. 7, p. 9 (Dec. 1997).
Eldad, Gefen, "Getting Personal, Printing your first personalized job may be easier than you think", DocuWorld Issue 1, vol. 2, p. 42 (1998).
Group 1 Software Advertisement: "DOC1 Delivers What You Want, When You Need It," *DocuWorld*, Issue 1, vol. 2, p. 23 (1998).
Indigo Brochure: "Indigo Yours Truly Personalization—Profitability" (1997).
Meadows Information Systems Flyer : "DataMerge—Personalize documents with this powerful XTension to QuarkXPress", undated.
Meadows Information Systems Flyer : "Group Picture—Save complete Groups of QuarkXPress items in their original layout", undated.
Scitex/Xerox Advertisement: "Xerox and Scitex Bring You the Magic of Professional Color," *Docuworld*, Issue 1, vol. 2, p. 39 (1998).
Scitex brochure: "Scitex Xerox Success Stories: CAD Graphics, Chicago, Illinois" (Jul. 1998).
Scitex brochure: "Scitex Xerox Success Stories: DW Graphics, Stockton, CA" (Jul. 1998).
Xerox brochure: "think color: Xerox DocuColor 70" (1998).
Xerox brochure: "New Generation Fiery Technology for the Xerox DocuColor 70 Digital Color Press: Fiery ZX-70" (1998).
Xerox brochure: World-class prepress performance for the Xerox DocuColor 70 Digital Color Press: Scitex SX3000T (1998).
Xerox brochure: "Xerox VIPP—the fastest, most reliable method to reach your customers individually . . . all at the same time" (1998).
Xerox brochure: "BOOM!—The Explosion is in Short-run Digital Color Printing" (1998).
"Varis Tackles Variable-Data Bottlenecks," Seybold Report on Publishing Systems, (Dec. 14, 1998).
"About Meadows" Meadows Publishing Solutions, www.meadowsinfo.com/mishtml.meadows (Jul. 28, 2004).
"Boom!" Xerox, The Document Company, (Dec. 1997).
"Creating Variable Power"- *Printing World*, Miller Freeman Publications, Article 2, p. 18, (Jun. 21, 1999).
"Darwin Desktop 2.0 is Now Shipping" Press Reports (Oct. 29, 1998) (3 pages).
"Enhanced Technique for Merging Data From a Second Document" IBM Technical Disclosure Bulletin, vol. 30 No. 5, IBM Corp., pp. 184-188 (Oct. 1987).

PODi, "Frequently Asked Questions about PPML The Personalized Markup Language" PPML Frequently Asked Questions (Dec. 12, 2000) (3 pages).
"Improved Technique for Printing Multi-copy Documents" IBM Technical Disclosure Bulletin, vol. 29 No. 1, IBM Corp., pp. 406-407 (Jun. 1986).
"Indigo E-Print in 3 places-and in Spindler Speech" *Seybold San Francisco*, p. 34 (Oct. 23, 1995).
"Indigo® History and Backgrounder," Company Background www.indigonet.com (Dec. 21, 1999) (1 page).
"Method for Joining Documents for Printing in a Personal Computer System" IBM Technical Disclosure Bulletin, vol. 29 No. 7, IBM Corp., pp. 3090-3091 (Dec. 1986).
"NCIC Closes with the Varis Corporation" NCIC Capital Link Quarterly, vol. 3, Issue 1 (1999) www.ncicfund.org/newsletter/1999-v3il/page1.htm.
"New Products-Treasure Hunt," *Electronic Publishing*, p. 68 (Mar. 1999).
"Varis Production-Oriented Fully Audited Variable Data Solutions" Next Generation, CAP Ventures, Inc., (pp. 1-20) (Jan. 12, 1998).
"Xeikon Personalizes with Private-1" Seybold Special Report, vol. 4 No. 2, p. 35, (Oct. 23, 1995).
"PPML Personalized Print Markup Language," Functional Specification Version 1.5 (May 31, 2001).
"PPML Personalized Print Markup Language," Functional Specification Version 2.1 (Jul. 31, 2002).
"Redefining the Printed Page," Varis Corporation, Mason, OH, vol. 4 (Oct. 2, 1997).
"The Digital Press" Xeikon Brochure (6 Pages) (Jan. 1999).
"Think Color" Xerox DocuColor 70, Xerox (1998).
"Process Overview Chart," TTM Process Guide Release 2.0 (Jul. 1997).
"Up Close and Personal" May 1, 1999 Printing Impressions, p. 72 (May 1, 1999).
"Variable Printing with Indigo" Seybold Special Report, vol. 3, No. 8 pp. 63-64, (Apr. 21, 1995).
"Xeikon, Varis Alliance to Expand Potential of Variable Printing," Printing Impressions, p. 94(1), (Dec. 1, 1998).
"Xerox Corporation Overview" Hoover's Online, pp. 1-4 (1999).
"Variable-Data Products" Xerox Seybold Interactive Report, www.seyboldreports.com, (2 pages) (Jan. 26, 2004).
"Xeikon Personalizes Printing with Private-1 Software for DCP-1s" Electronic Publishing (1 page) (Jan. 1, 1996).
ANSI CGATS "Graphic Technology- Variable Printing Data Exchange Using PPML and PDF (PPML/VDX)" Jul. 8, 2002.
Benedeck, Andy "Extending the Capabilities of QuarkXPress," *British Printer*, p. 51 (Oct. 1996).
International Search dated Jun. 7, 2000, International Application No. PCT/US99/20203.
David L. Zwang "Digital Printing: A Variety Show" American Printer, Article II pp. 1-5 (Feb. 28, 1999).
Edelstein, Herb "Mining for Gold," Information Week Labs, pp. 53-54, 61-62, 66, & 70 (Apr. 21, 1997) www.informationweek.com.
Introduction to the Personalized Print Markup Language: The PPML Family of XML Standards PODi (pp. 1-8) (Jul. 22, 2003).
Kaufeld "Paradox 5 for Windows for Dummies," (1994).
Mizuno et al., "Document Recognition System with Layout Structure Generator," *NEC Research and Development*, vol. 32, No. 3, Tokyo, Japan (pp. 430-437) (1991).
"PageFlex," Bitstream, Inc. (5 Pages) (Oct. 29, 1998), www.bitstream.com.
Rousseau et al., "Writing Documents for Paper and WWW; A Strategy based on FrameMaker and WebMaker," Computer Networks and ISDN Systems, vol. 27 (pp. 205-214) (XP 000571730) (1994).
Simoudis, Evangelos "Reality Check for Data Mining," *IEEE Expert* (pp. 26-33) (1996).
"DCP/32S," Xeikon Digital Color Printing, Xeikon America, Inc., Wood Dale, IL (Jun. 1998).
Xerox VIPP brochure (1998).
Yours Truly (2 Pages) (Dec. 6, 1999) www.indigo.net.com/yours_truly.htm.

"Indigo Unveils Revolutionary RIPless Personalization Technology," PR Newswire (Dow Jones Interactive Publications Library) (2 Pages) (Oct. 18, 1999).

"Impressive Joins Adobe in E-Commerce Project," The Seybold Report on Publishing Systems (Dec. 20, 1999).

"Indigo and Pageflex Announce Variable Data Printing Initiative," PR Newswire (2 Pages) (Dec. 6, 1999).

"New Desktop Software Provides Inkjet Link," Graphic Arts Monthly (p. 27) (Aug. 1994).

Alan Simpson, "Mastering WordPerfect 5.1 & 5.2 for Windows," (26 Pages) (1993).

B. Lawler, "Some for the Books; Imposition; Hands On: Desktop Publishing; Tutorial," vol. 10, No. 9, p. 121, MacUser, Sep. 1994 (pp. 22-28).

Microsoft Excel User's Guide (pp. 259-362 and 703-726).

Alexander, George A., "Custom Book Publishing and Book Printing on Demand," The Seybold Report on Publishing Systems, vol. 21, No. 16, May 11, 1992 (pp. 1 and 3-12).

Appelt, Wolfgang, "Existing Systems for Integrating Text and Graphics," Computer & Graphics, vol. 11, No. 4, (1987), (pp. 369-375).

International Search Report dated Apr. 13, 1999 (7 Pages).

H. Sharples, "Software Automates Impositions; Prepress Imaging," vol. 65, No. 9, p. 67, Graphic Arts Monthly (Sep. 1993).

"Linotype-Hell'Herkules: Fast, Versatile Drum Imager to Head IPEX lineup; Product Announcement," vol. 23, No. 1, p. 3, The Seybold Report on Publishing Systems (Sep. 1, 1993).

"Aldus to Offer Presswise 2.0 Imposition Software for Large-Format Presses," PR Newswire (Sep. 7, 1993).

P. Dyson, "Computer to Plate: Now There's a Market; Direct-to-Plate Production Now Feasible; includes related article on the Eskofot Escosan 2540 for boards and films," vol. 23, No. 4, p. 3, The Seybold Report on Publishing Systems (Oct. 11, 1993).

"Imposition Cuts Stripping Time; Electronic Imposing System; Prepress Imaging," vol. 65, No. 11, p. 84, Graphic Arts Monthly (Nov. 1993).

S. Edwards et al., "IFRA *93 Review: An Industry Riding the Crest of a Slump; IFRA European Newspaper Equipment Exhibition; includes related article on trade show rumors," vol. 23, No. 6, p. 3, The Seybold Report on Publishing Systems (Nov. 8, 1993).

H. Sharples, "Electronic Imposition: Moving Forward," vol. 66, No. 2, p. 53, Graphic Arts Monthly (Feb. 1994).

"Aldus Prepress Division Ships Presswise 2.0 for the Apple MacIntosh," PR Newswire (Mar. 22, 1994).

"Press Imposition Software; Seybold Special Report: Seybold Seminars Boston *94, Part I; Product Announcement," vol. 23, No. 15, p. S74, The Seybold Report on Publishing Systems (Apr. 22, 1994).

"High-Resolution Output; includes related articles on how to obtain a Hyphen print sample and naming a new screening technology; Seybold Special Report: Seybold Seminars Boston *94, part I," vol. 23, No. 15, p. S47, The Seybold Report on Publishing Systems (Apr. 22, 1994).

P. Hilts, "Donnelley's Digital Production Vision; R.R. Donnelley and Sons invited book publishers to come to Crawfordsville to see the future of printing," vol. 241, No. 34, p. 24, Publishers Weekly (Aug. 22, 1994).

A. Karsh, "Scitex's SGAUA Review: Savanna, GTO-DI Interface, Whisper Upgrade; Scitex Graphic Arts User Association, Scitex Savanna Typesetting System, Press Interface for GTO-DI, Autoflat Image Processing Software, MacCSS Connection Peripheral Server," vol. 24, No. 2, p. 11, The Seybold Report on Publishing Systems (Sep. 19, 1994).

"Color Shop Goes Electronic; Color Tech Corp.," vol. 66, No. 10, p. 90, Graphic Arts Monthly (Oct. 1994).

"Xerox and Scenicsoft Bring New Flexibility to Prepress Work With Postscript Files," vol. 7, No. 10, Worldwide Videotex (Oct. 1994).

"High-Resolution Output Devices; Seybold Special Report: Seybold San Francisco *94, Part 1; Product Announcement," vol. 24, No. 3, p. S32, The Seybold Report on Publishing Systems (Oct. 26, 1994).

"Output Servers; Seybold Special Report: Seybold San Francisco *94, part 2, Product Announcement," vol. 24, No. 3, p. T13, The Seybold Report on Publishing Systems (Oct. 26, 1994).

"CTP Field Gets a New Entry; Linotype-Hell's Computer-to-Plate System, Gutenborg," vol. 66, No. 11, p. 102, Graphic Arts Monthly (Nov. 1994).

T-R Systems Internet Website: "About T-R Systems" (Nov. 2, 1998).

Scitex/Darwin "Powerful Variable Information Tools for Scitex DFEs" Scitex.

InfoPrint 4100.

Xeikon Digital Color Printing brochure.

ULTIMATE Technographics, Inc. Manual, "Poststrip," 1989.

"Design Your Forms, Power with Room to Grow: Xbasic™" advertisement, DBMS Magazine, Sep. 1994.

"The Latest Word," *The Seybold Report on Publishing Systems*, vol. 24, No. 6, (Nov. 30, 1994).

"Indigo Expands Digital Press Line to Packaging; Enhances E-Print 1000," *The Seybold Report on Publishing systems*, vol. 24, No. 13, pp. 3-12 (Mar. 13, 1995).

"Variable data and custom printing," *Seybold Special Report*, vol. 3, No. 8, pp. 63 and 64 (Apr. 21, 1995).

"Indigo System Developments: Indigo varies data, shows Mobius, Omnius," *The Seybold Report on Publishing systems*, vol. 24, No. 20, pp. 12-15 (Jun. 26, 1995).

"Variable Data on Digital Presses: Making Progress," *The Seybold Report on Publishing Systems*, vol. 25, No. 22, pp. 3-8 (Aug. 26, 1996).

"Indigo Variable Data Soulution Evaluation," Interoffice Memorandum from R.R. Donnelley & Sons Company dated Jul. 26, 1995, (portions redacted).

DPS Internet Website, URL: www.databaspub.com/bottom.html (Oct. 31, 1998).

Scitex/Darwin "Powerful Veriable Information Tools for Scitex DFEs" Scitex.

* cited by examiner

VARIABLE TEXT PROCESSING FOR AN ELECTRONIC PRESS

FIELD OF THE INVENTION

The present invention relates generally to reproduction methods and systems and, more particularly, to a method of and system for processing variable text areas of a template page to control a display device, such as an electronic press.

BACKGROUND OF THE INVENTION

Demand printing systems utilizing an electronic press have provided the capability to produce different versions of books and/or customized books within a single press run. Demand printing systems, in general, are capable of high speed printing of images from electronic representations thereof. The electronic representations of the images for a press run are typically provided as a plurality of data files to the electronic press for subsequent processing thereby.

Upon receipt of the data files, the electronic press produces high quality color images using, for example, a set of fusible toners in an electrophotographic process. Electronic presses have also utilized electrographic, inkjet, and other printing technologies. During an exemplary press run, a web of paper is passed adjacent a series of drums, each of which has been electrostatically charged according to an image pattern for a particular color to be applied to the web. Alternatively, multiple sheets of paper are utilized instead of the paper web in a sheet-fed process. In either case, charge is transferred to the paper and an oppositely charged toner of the proper color is brought into contact with the paper. The oppositely charged paper and toner attract so that the toner is held on the paper as other colors are applied thereto. The toners and paper are thereafter heated to fuse the toners to the paper to produce the final image. If necessary, the web is then cut into sheets (or "forms") and the forms are further processed as needed to produce a final product.

Preparation for an electronic press run typically begins with steps taken by a publisher to establish the content for a book, the content including both fixed information and, for customization, variable information. At this stage, the book is represented by one or more template files that have been generated by a page make-up program. Each template file is typically representative of both the content and location of the fixed information, as well as the location of the variable information, for one or more pages of one or more book versions. Data representative of the variable information may then be provided in database format in another file generated by the publisher.

A user interface has been developed by the assignee of the present application to facilitate the preparation and further processing of the template files. This user interface is programmed as an extension of QuarkXPress® and provides a user with the ability to define variable areas for a page in a template file, each area being a location in which variable text or a variable image will be disposed. The template file and the database are then processed to develop a press command file (or a "book ticket file") to control the electronic press.

The database typically contains all of the variable text that will be utilized to produce customized books. As a result, a press run involving a book with lengthy sections of variable textual information requires a database having large amounts of data. The database may then require extensive data entry and/or management, and may eventually become unwieldy for large press runs.

In the past, the complexity of the database has been minimized by permitting the publisher to create multiple versions of a book, each of which, in turn, may be customized via the above-described processing. Each version is represented by master pages, which are common to all of the books of the same version, as well as variable pages, which may vary from book to book of the version. The version of each book to be produced is typically identified in the database. The identified version, in turn, specifies one or more template pages to be processed by the user interface described hereinabove to generate the master pages of the identified version. Consequently, the size of the database decreases as more of the customization involved in the press run is provided via the master pages generated for each version of the books to be produced. However, each additional version requires the publisher to create a separate set of template files, thereby undesirably increasing the time required for page make-up.

SUMMARY OF THE INVENTION

In accordance with one aspect of the present invention, a software system is useful for generating a page file from a template file and database entries. The database entries specify variable information and the template file includes data designating a variable text area. The software system includes a computer-readable medium and a software program stored in the computer-readable medium. The software program, in turn, includes a first routine that associates the variable text area with a text file in accordance with the database entries, and a second routine that generates the page file from the template file and the text file.

In a preferred embodiment, the text file includes a variable information placeholder. The software program may then include a third routine that derives a further text file from the first-named text file in accordance with the variable information placeholder and at least one of the database entries. The second routine preferably generates the page file from the further text file. The third routine may modify the first-named text file to derive the further text file. The database entries are preferably stored in a database under a plurality of field names. A fourth routine of the software program may then generate an associations file having association data linking one of the plurality of field names with the variable information placeholder. The variable information placeholder preferably has a word position in the text file such that the association data is representative of the word position of the variable information placeholder.

In another preferred embodiment, the page file includes a variable data file. The variable data file preferably includes page description data readable by an electronic press to print books.

In yet another preferred embodiment, the variable text area is designated by a text file placeholder, and the database entries are stored in a database under a plurality of field names, such that the text file is specified by data stored under one of the plurality of field names associated with the text file placeholder.

In accordance with another aspect of the present invention, a method is useful for generating a page file from a template file and database entries. The database entries specify variable information and the template file includes data designating a variable text area. The inventive method includes the steps of associating the variable text area with a text file in accordance with the database entries and generating the page file from the template file and the text file.

In a preferred embodiment, the text file includes a variable information placeholder. The inventive method preferably includes the step of deriving a further text file from the first-named text file in accordance with the variable information placeholder and at least one of the database entries. The generating step may then include the step of processing the template file to include further data stored in the further text file. The deriving step preferably includes the step of modifying the first-named text file. The database entries may be stored in a database under a plurality of field names such that the inventive method further includes the step of generating an associations file having association data linking one of the plurality of field names with the variable information placeholder. The variable information placeholder preferably has a word position in the text file such that the association data is representative of the word position of the variable information placeholder.

In another preferred embodiment, the page file includes a variable data file. The variable data file may then include page description data readable by an electronic press to print books.

In a further preferred embodiment, the variable text area is designated by a text file placeholder, and the database entries are stored in a database under a plurality of field names, such that the text file is specified by data stored under one of the plurality of field names associated with the text file placeholder.

In accordance with yet another aspect of the present invention, an apparatus is useful for generating a page file from a template file and database entries. The database entries specify variable information, while the template file includes data designating a variable text area. The inventive apparatus includes a mechanism for associating the variable text area with a text file in accordance with the database entries, and a mechanism responsive to the associating mechanism for generating the page file from the template file and the text file.

In accordance with still another aspect of the present invention, a software system is useful for generating a page file from a template file and database entries. The database entries are representative of variable information and the template file includes data designating a variable text area. The software system includes a computer-readable medium and a software program stored in the computer-readable medium. The software program, in turn, includes first, second, and third routines. The first routine associates the variable text area with a first text file wherein the text file includes a variable information placeholder, while the second routine derives a second text file from the first text file in accordance with the variable information placeholder and at least one of the database entries. The third routine then generates the page file from the template file and the second text file.

The page file preferably includes a variable data file. The variable data file may include page description data readable by an electronic press to print books having variable content.

In a preferred embodiment, the database entries are stored in a database under a plurality of field names. The first text file includes a further variable information placeholder, and the first-named and further variable information placeholders have a respective word position in the text file. The second routine preferably associates the first-named and further variable information placeholders with corresponding database field names of the plurality of database field names and develops array data representative of the respective word position of the first-named and further variable information placeholders and the corresponding database field names. The second routine may generate a file comprising the array data stored in reverse order.

In another preferred embodiment, the variable text area is designated by a text file placeholder, and the database entries are stored in a database under a plurality of field names. The text file is accordingly specified by data stored under a field name of the plurality of field names associated with the text file placeholder. The template file may include further data representative of a general text area having the variable text area therein. Further, the general text area may include a further text file placeholder.

The variable information may be representative of formatting codes for text in the modified text file.

In yet another preferred embodiment, the software program preferably includes a fourth routine that determines whether the variable information placeholder is a text file placeholder. The software program may include a routine that prompts a user to establish a location of the database. Alternatively, the database entries may also be stored in a database that includes data identifying a storage location of the text file.

In accordance with another aspect of the present invention, a method is useful for generating a page file from a template file and database entries. The database entries are representative of variable information and the template file includes data designating a variable text area. The inventive method includes the steps of associating the variable text area with a first text file wherein the text file includes a variable information placeholder, deriving a second text file from the first text file in accordance with the variable information placeholder and at least one of the database entries, and generating the page file from the template file and the second text file.

In a preferred embodiment, the inventive method further includes the step of determining whether the variable information placeholder comprises a text file placeholder. Preferably, the database entries are stored in a database under a plurality of field names. The variable information placeholder may have a word position in the text file such that the associating step includes the step of storing data representative of the word position and one of the plurality of field names.

In accordance with still another aspect of the present invention, a system for generating a page file includes first, second, and third memories. The first memory stores a template file comprising first data designating a text file placeholder, the second memory stores data representative of the variable information, and the third memory stores a plurality of text files. Each text file includes a respective plurality of variable information placeholders. The inventive system further includes a processor coupled to the first memory, second memory, and the third memory and is configured to perform a first task, a second task, and a third task. The first task associates the text file placeholder with a first text file of the plurality of text files, while the second task derives a second text file from the first text file in accordance with the data and the plurality of variable information placeholders of the first text file. The third task then generates the page file from the template file and the second text file.

In a preferred embodiment, the second memory stores third data specifying the first text file of the plurality of text files. The system preferably further includes a computer-readable medium that includes the first memory, second memory, and the third memory. At least one of the plurality of variable information placeholders may include a further text file placeholder. The second memory may store third data specifying a location of the third memory.

Other features and advantages are inherent in the system and method claimed and disclosed or will become apparent to those skilled in the art from the following detailed description in conjunction with the accompanying drawings.

DETAILED DESCRIPTION OF PREFERRED EMBODIMENTS

Figure 1:
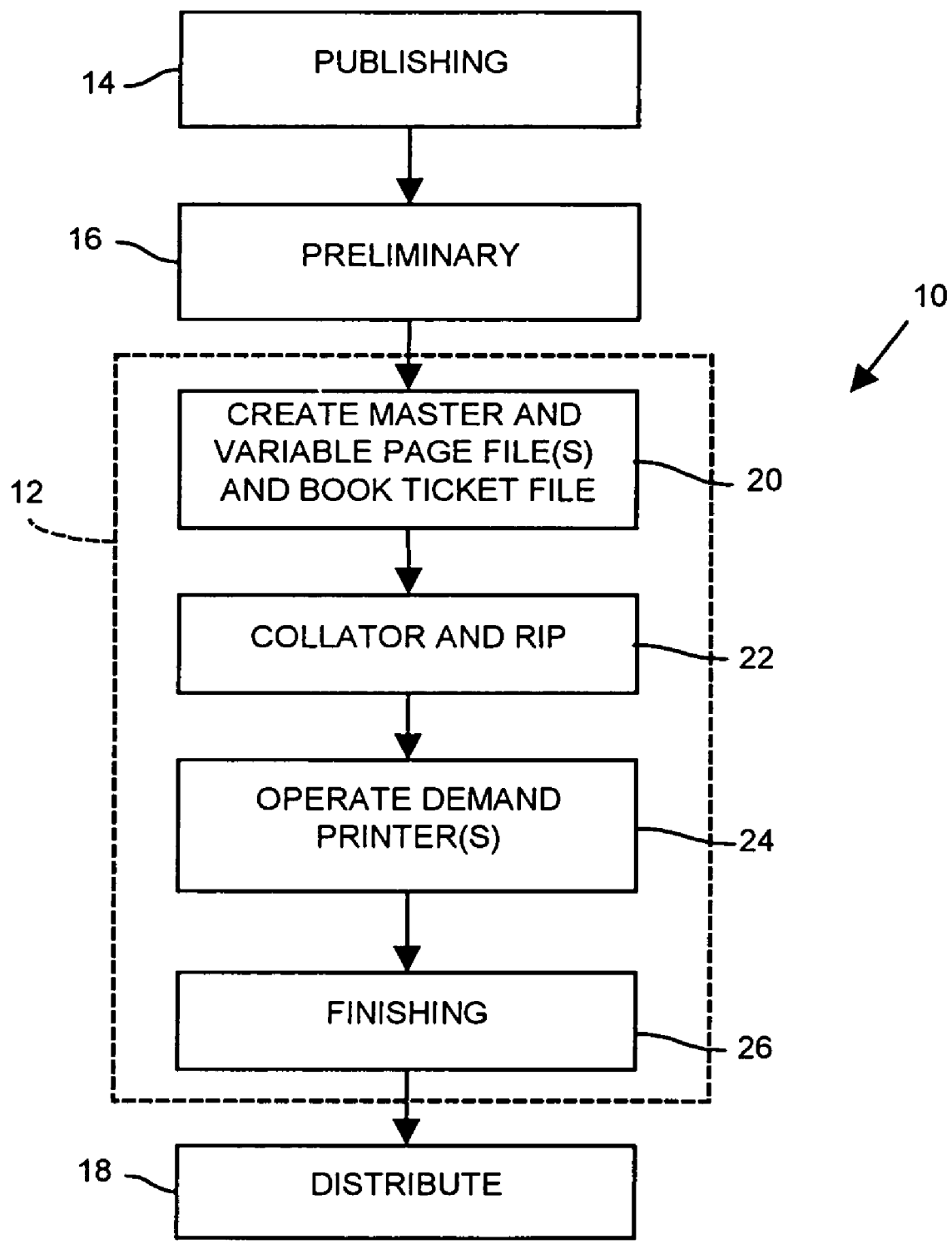
FIG. 1 is a block diagram of a method of producing books using an electronic press.

FIG. 1 illustrates a block diagram of a method 10 of producing books using an electronic press, which is operated during a press-run step 12. The electronic press utilizes the output of a publishing step 14, during which the contents of one or more book versions are determined. As an example, all of the versions could include a set of common pages, with one or more of the versions including one or more additional pages unique to such version(s). Alternatively, all of the versions may be completely different, in the sense that there are no pages common to two or more of the versions. Also, a version may include books that are all identical or not identical, the latter being the case when one or more books of the version include variable information. After the content of each version has been determined, a preliminary step 16 may be undertaken for color correction of color images together with undercolor removal and screening for halftone images. The books produced by the press-run step 12 are then distributed according to a step 18, which may include delivery to customers via, for example, the U.S. Postal Service.

The press-run step 12 will now be further described. During a step 20, one or more master and variable page files are created in, for example, a page description language (PDL) such as PostScript® (PostScript® is a trademark of Adobe Systems, Inc., for its page description language). These page files may alternatively be encoded in a page markup language, such as SGML (Standard Generalized Markup Language), HTML (HyperText Markup Language), or XML (Extensible Markup Language). Taken together, the master and variable page files represent pages to be produced. A press command file (i.e., book ticket) is also developed during the step 20 for specifying the manner in which data contained within the master and variable page files are to be merged to produce the printed pages. The format of the press command file is specified by Barco Graphics of Gent, Belgium and is particularly suited for control of a DCP-1 digital color press manufactured by Xeikon of Mortsel, Belgium. It should be noted that the system and method of the present invention are not limited to use with a particular type of demand printer or a particular system for controlling such a printer, inasmuch as the invention can be adapted for use with any type of printer or control whether located locally or remotely. Moreover, the practice of the present invention is not limited to an electronic press context, inasmuch as the teachings of the present invention may be applied to any production environment involving electronic delivery or distribution. For example, electronic display media, such as dynamic web pages, may receive the above-noted files to present content on a display device.

The master and variable page files are then converted during a step 22 by a raster image processor (RIP) into bitmaps, which may be stored in a memory and later retrieved by a collator (described hereinbelow in connection with FIG. 3), which is responsive to the press command file. Thereafter, during a step 24, the stored bitmaps along with the press commands are used to control one or more demand printers and/or any other type of display device, such as a laser printer, a CRT, an LCD display or the like so that the device displays pages having fixed and variable information thereon.

Alternatively, the master and variable page files may be premerged to create a plurality of combined files each representing a page to be reproduced with master and variable information. The combined files can be then sent to any type of printer or other display device, whether local or remote. Also, the combined files can be converted to a suitable format (e.g., Acrobat® PDF format) and transmitted to a remote location using a facsimile machine, e-mail or other transmission medium, if desired. Lastly, during a finishing step 26, the assembled books are bound and trimmed and, if desired, further customization can be effected.

Figure 2:
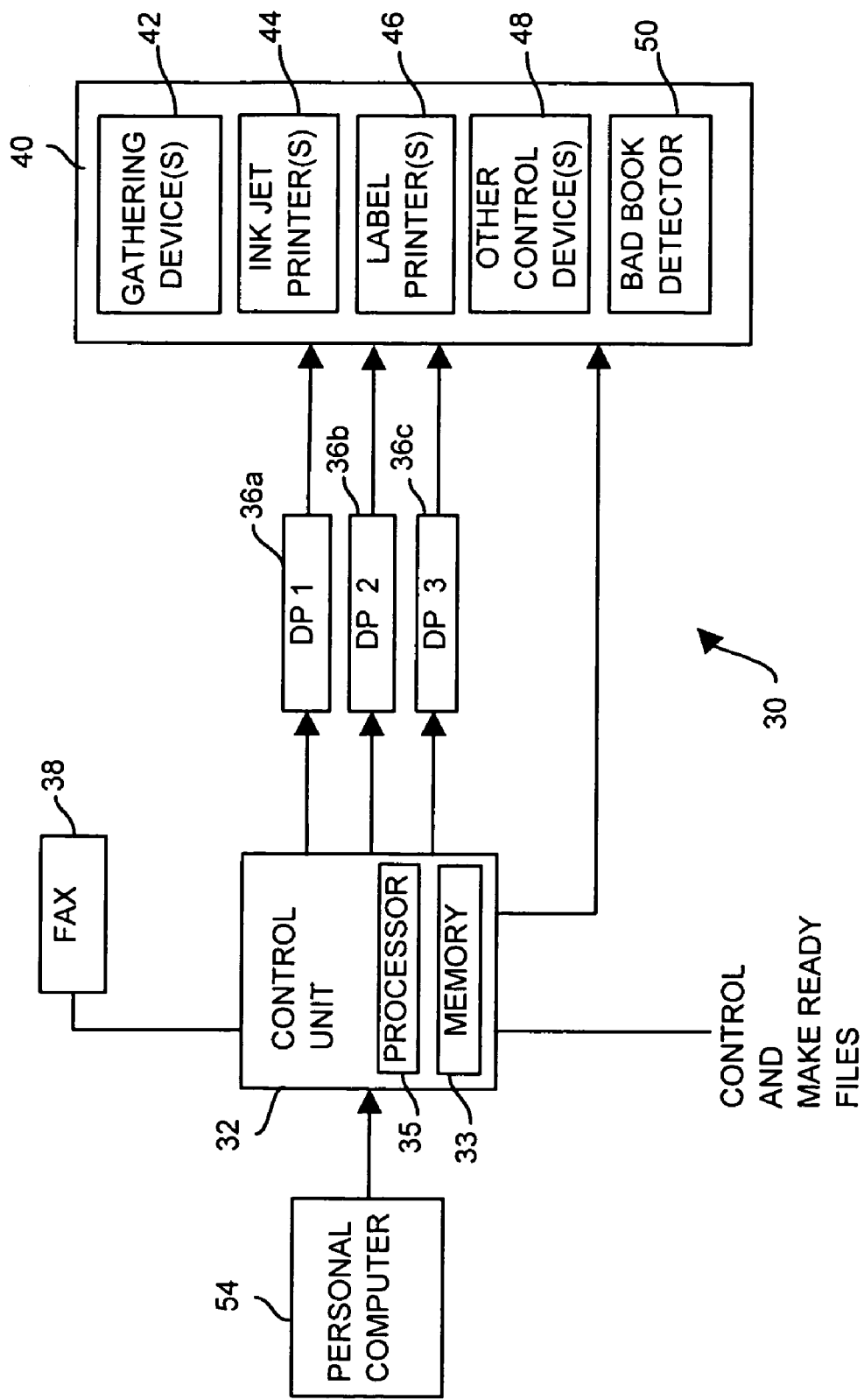
FIG. 2 is a block diagram illustrating an exemplary system for implementing the method of producing books illustrated in FIG. 1.

FIG. 2 illustrates a system 30 which implements the steps 12, 14 and 16 of the method 10 of FIG. 1. A control unit 32, which may be implemented by a personal computer or any other type of computer, includes a memory 33 and stores therein data representing images to be printed. The data may be specified by a publisher using a personal computer 34 or any other type of computer and may comprise one or more template files. Each template file may include data representative of fixed information (i.e., printed information which does not vary from book-to-book of the same version) and the location thereof on the page to be printed or otherwise displayed. Each template file further includes data representative of the location of variable information for each page of a book to be produced. While the variable information to be printed may vary from book-to-book, the location of the variable information on each page to be printed or otherwise displayed does not vary among books of the same version. Preferably, a single template file may contain such information for a plurality of pages such that one template file is generated for an entire book.

In the case of data representing textual variable information, such data is stored in a database or other data storage arrangement created by the publisher. The database may also include file names of image data files representing images to be printed. The particular data storage arrangement and format are not critical to the practice of the present invention and, hence, data may be provided in any fashion (e.g., in a distributed manner over a network) or in any format (e.g., in any generic markup language).

A processor 35 of the control unit 32 executes programming comprising one or more software routine stored in the memory 33 and responsive to the template file(s) generated by the personal computer 34 to control one or more demand printing systems 36. As will be described in greater detail hereinbelow, the programming is further responsive to input data files to transform the template files into the master and variable page files in a format suited for the demand printing systems 36. The press command file is preferably generated at this stage to reflect the manner in which the master and variable page files are to be processed by the demand printing systems 36. If desired, the data stored in the input data files may be obtained from any type of device or devices, such as a scanner (not shown), or the data may be provided over a network or any other source.

The control unit 32 is further responsive to control and makeready files for causing the demand printing systems 36 to print desired pages. While three demand printing systems 36a-36c are illustrated in FIG. 2, it should be understood that the control unit 32 may operate a different number of demand printing systems, as desired. Also, the control unit 32 may operate a fax machine 38 and/or may communicate with other remote devices to send properly converted and combined files, as desired and as noted above. The combined files may be printed or may alternatively be distributed, delivered, or reproduced in a different medium and/or may comprise a non-static image or other information, i.e., movies or audio. For instance, the combined files may be delivered to a computer-to-plate system (not shown) for the generation of printing plates to be utilized by a conventional press for the printing of books. The combined files may also be delivered and formatted for processing and display on an electronic book or other electronic display devices. To this end, the combined files may be organized in a variety of fashions, such as by separate book chapters in the sense that each chapter is represented by a page markup file having a respective callout for each image to be generated on a particular page in the chapter. The display order of the chapters of the book to be displayed may then be specified by an XML file or other file that specifies the page markup files associated with each chapter. In this manner, execution of the codes stored in the XML file controls the navigation of the book being displayed by the electronic book or other device.

The pages printed by the demand printing system 36 may be supplied to a finishing apparatus 40 which includes various auxiliary production devices and device interfaces for assembling the pages to produce finished books that are ready for distribution. The finishing apparatus 40 may include one or more gathering devices 42 for gathering printed pages into books, one or more ink jet printers 44 for printing additional customized information, such as addressee information, on each book, one or more label printers 46 for printing address labels and/or other control devices 48. In addition, one or more detectors 50 may be provided to sense when a defective book is produced. The control unit 32 may be responsive to the output of the detector 50 to reorder a defective book at an appropriate point in the production sequence thereof so that advantage can be taken of postal discounts, if possible.

Figure 3:
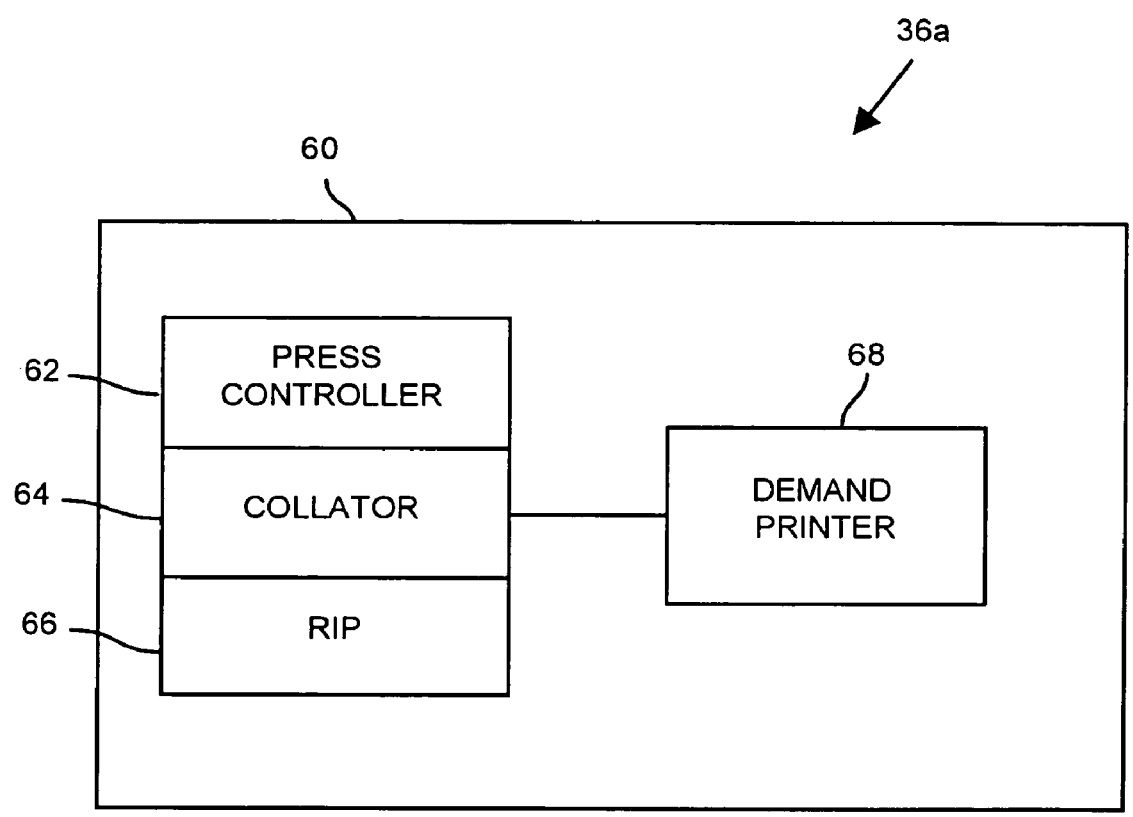
FIG. 3 is a block diagram illustrating one of the demand printing systems of FIG. 2 in greater detail.

FIG. 3 illustrates the demand print system 36a of FIG. 2 in greater detail, it being understood that the systems 36b and 36c are identical thereto. The system 36a includes a print system 60 having a press controller 62, a collator 64 and a raster image processor (RIP) 66 which are operable in response to press commands generated by the control unit 32. A collator is an electronic device for storing raster image processor files (i.e., bitmap files) and delivering selected files to a digital press in real time, such that the digital press can run at full speed while processing and printing unique page data for each book produced on the press. The RIP 66 converts the page files to bitmap format or any other format, such as a symbolic printer control language. The collator 64 includes memory (not shown) in the form of mass storage drives and physical memory and collates the bitmap page files. If desired, the collator 64 and/or RIP 66 may comprise a part of the press controller 62. The controller 62 instructs the collator 64 to send page files to a demand printer 68. The print system 60 may comprise the PrintStreamer system, manufactured and marketed by Barco Graphics of Belgium, while the demand printer 68 may comprise the Xeikon DCP-1 digital color press noted above. It should be noted that a different print system and/or demand printer may alternatively be used, such as the Indigo printer manufactured by Indigo of NV, of Maastricht, Netherlands, if desired.

Figure 4:
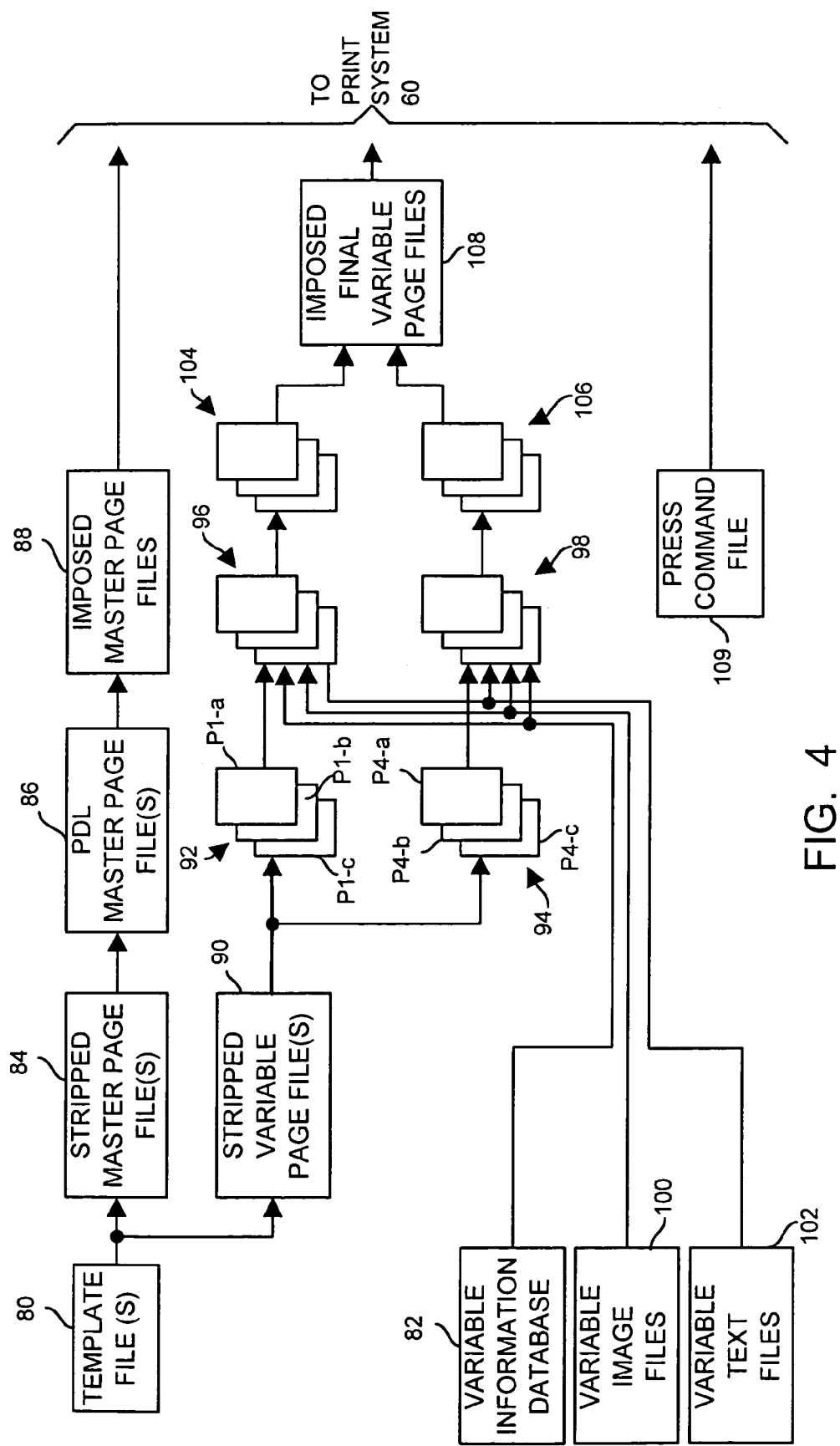
FIG. 4 is a generalized diagram of files processed and/or generated by the system of FIG. 2.

FIG. 4 illustrates the step 20 (FIG. 1) of creating the master and variable page files and press commands in greater detail. For ease in description, it shall be assumed that three, four-page books will be produced, with fixed information on each page and variable information only on the first and fourth pages of each book. Initially, one or more template files 80 are developed by a publisher specifying the content (including appearance) of the fixed information as well as the position of all information (i.e., areas of either fixed information or variable information) of the different books or book versions. A database 82 is also developed by the publisher using the personal computer 34 (FIG. 2) to include or specify the variable information to be placed in the variable information areas defined in the template files 80. The database 82 further includes control information, as noted in greater detail hereinafter in connection with further details regarding the structure and nature of the database 82.

The template files 80 are first duplicated to create working files. One set of working files is stripped of all area data relating to the placement of variable information to create stripped master page files 84 having only data representative of fixed information. The stripped master page files 84 are then converted into PDL master page files 86 expressed in a page description language, such as PostScript®. An optional imposition process may then convert the PDL master page files 86 into imposed master page files 88 each representing a side of a piece of paper to be printed with one or more pages having fixed information only thereon.

A further set of working files is stripped of all data representative of fixed information to create stripped variable page files 90 having the area data defining the areas in which the variable information is located. The stripped variable page files 90, and the page files generated therefrom, are considered types of "variable data files." A variable data file, as used herein, refers to any file having data utilized to print customized books and which includes data indicative of information other than fixed information. Such data may represent, for example, variable information, formatting information, layout and position information and the like.

The stripped variable page files 90 are then expanded into a set of intermediate page files. In this example having two pages with variable information, two intermediate page files 92, 94 are produced. The file 92 includes a first portion P1-a defining the position(s) of variable information to be produced on the first page for the first book. Two other file portions P1-b and P1-c define the position(s) of variable information to be produced on the first pages of the remaining two books. In like fashion, file portions P4-*a*, P4-*b* and P4-*c* of the file 94 represent the positions of variable information to be reproduced on the last page of each of the three books, respectively.

The position of variable information in the template file(s) 80, the stripped variable page file(s) 90, and the intermediate page files 92, 94 is established with one or more placeholders. Each placeholder comprises data which designates an area on the page (to be printed) as a variable information area (i.e., an area on the page in which variable information will be inserted). To this end, the placeholder is identified by a placeholder name which is associated with both the variable information area as well as a field name in the database 82.

At this point, it would be instructive to describe the structure and nature of the database 82, which may be assembled as an ASCII file or in any other format. The database 82 includes a plurality of records wherein each record includes one or more fields having respective data entries stored therein. The fields (and hence the data entries) may be delimited by tabs, while the records may be separated by line returns. The fields are arranged under field names of a header wherein each field name, in turn, is associated with a placeholder. Each record of the database 82 preferably corresponds with a particular customized book to be produced and, consequently, the fields of each record contain all of the data entries necessary to specify the variable information for the particular customized book.

It should be noted that each record may further include fields directed to control information, in which case some field names may not be associated with a particular placeholder. Such optional fields may include a field designating the number of copies for each book to be produced, a townsort image field, a version identification field (indicative of book version number if multiple book versions are to be produced), a distribution list field, control data and the like.

Each database field dedicated to variable information may have one of several different types of data entries stored therein, including a variable image file name, a variable text file name, data representative of the actual variable textual information to be incorporated into the files 92, 94, or data representative of a hyperlink to a remotely located system having data representative of further information. To distinguish file names from actual variable text, the data stored in the field is preferably indicative of whether the field contains data representative of actual variable textual information or any one of the following: a text file name, an image file name, or a hyperlink. Numerous schemes for achieving these distinctions shall be apparent to those skilled in the art. It should be noted that each data element corresponding with a file name may include additional data specifying the storage location of the file (identified by the file name) in one or more memories, such as the memory 33 (FIG. 2). For example, if the memory 33 comprises a magnetic storage device, such additional data may comprise a directory path. The storage location of the file or data may also be specified by a hyperlink.

Alternatively, one or more of the database fields may be dedicated to storing data representative of a directory path or other storage location for each of the files identified by the file names listed in a particular database record.

In another alternative embodiment, the storage location of data files is not identified via the database 82, but rather via a user interface provided to a user at the time at which processing of the template file(s) 80 is desired. In this manner, the books printed in successive jobs based on the same template file(s) 80 and the same database 82 may be completely different, inasmuch as the storage location of each data file identified by file name in the database 82 may be changed between successive jobs.

With respect to those database fields having variable text file names stored therein, one or more variable text file names may be stored in a single field. Multiple text file names are demarcated by commas or any other suitable delimiting characters.

The files 92, 94 are then converted into variable page files 96, 98. The variable page files 96, 98 are substantially similar to the files 92, 94, respectively, the difference being that the data representative of the placeholders are replaced by data representative of the variable information to be printed in the customized books. The data representative of the variable information is retrieved from variable image files 100 and variable text files 102 identified by file name in the database 82, as well as from the database 82 itself. That is, the variable information data stored in the database 82 and the collection of variable image and text files 100, 102 is incorporated into the files 92, 94 to develop the variable page files 96, 98. The files 96, 98 are converted into PDL files 104, 106 in accordance with a PDL format (e.g., PostScript®). An optional imposition process may convert the PDL files into imposed final variable page files 108.

The print system 60 operates in response to the press commands in a press command file 109 to merge the page files 86, 96, and 98 (if the pages are not imposed) or to merge the page files 88 and 108 (if the pages are imposed) to create the finished books or book versions.

The database 82, the variable image files 100, and the variable text files 102 may be generated by any number of widely available applications adapted to be executed by the personal computer 34. For example, the database 82 may be generated by a spreadsheet or database management program, while the variable image and text files 100, 102 may be generated utilizing a word processing program having graphics capabilities. Once generated, the database 82 and the variable image and text files 100, 102 may be stored in the memory 33 of the control unit 32 or in any computer-readable storage medium accessible thereby. Those skilled in the art will appreciate that the database 82 and the variable image and text files 100, 102 need not be stored in the same location, and may, in fact, be stored in various media in a distributed fashion. The specific location and manner in which the database 82 and the variable image and text files 100, 102 are stored is not critical to practice of the present invention and, thus, any memory architecture or number of memories could be used.

Figure 5:
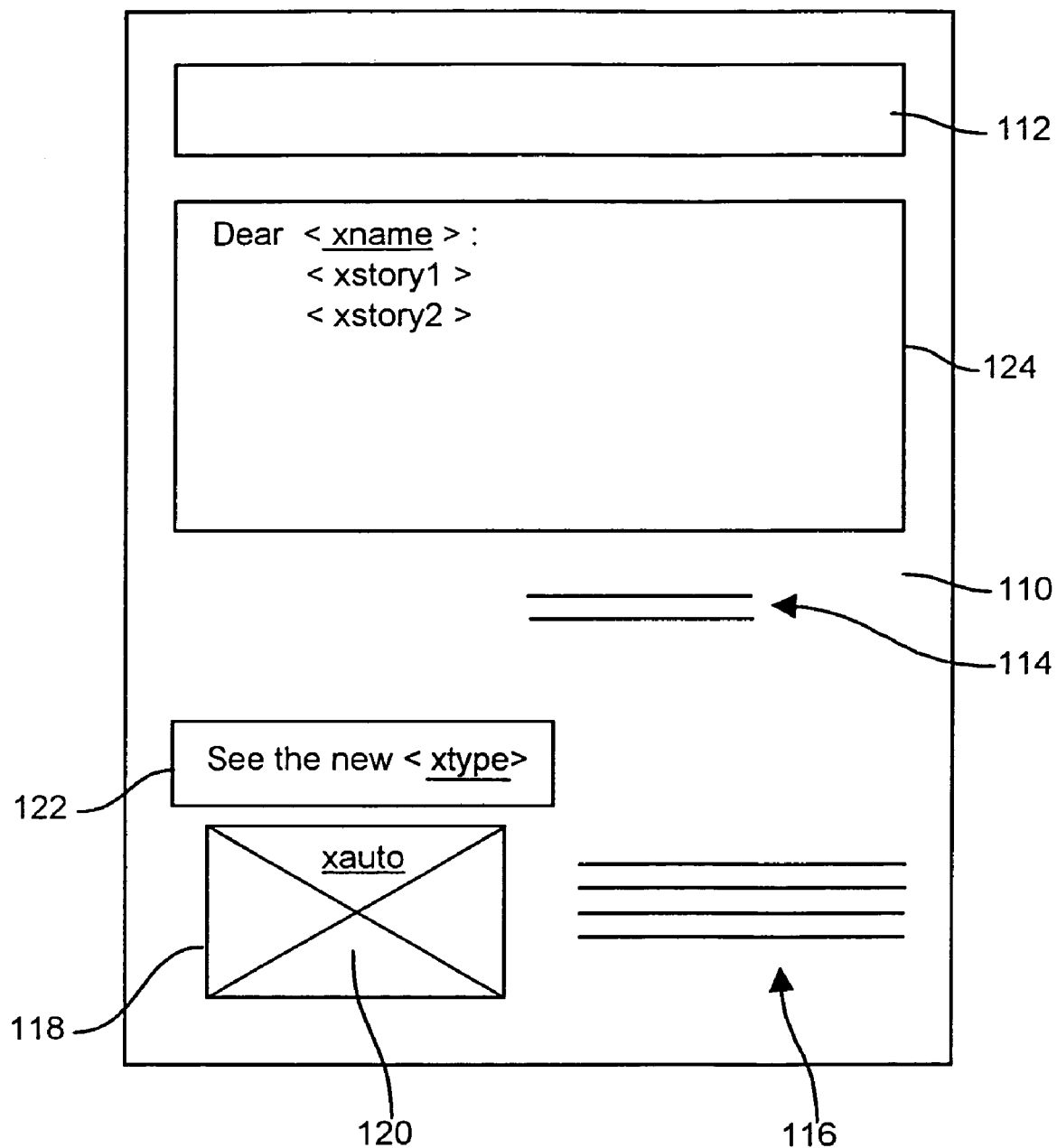
FIG. 5 is a generalized representation of a sample template page stored in the template file(s) 80 shown in FIG. 4.

FIG. 5 illustrates an exemplary template file having a single page 110 as it would appear in the page makeup program in which it was created. The page makeup program, which may be executed by the personal computer 34 or any other computer, may comprise a modification (e.g., an Xtension) of QuarkXPress®, a page makeup program distributed by Quark, Inc. of Denver, Colo. The modified QuarkXPress® program may be adapted for operation on the Apple® Macintosh® operating system or any other operating system, such as the Microsoft Windows® operating system. Alternatively, a different page makeup program may be used, if desired, which may used to present output in a number of other formats, such as HTML, XML, or DHTML.

The details of the programming associated with creating the template file 80 may be found in U.S. Pat. No. 5,963,968, the disclosure of which is hereby incorporated by reference. In summary, a user of the personal computer 34 utilizes the functionality provided by the modified page makeup program to select image, text, or line objects for placement on the page 110. These objects may incorporate fixed information, such as a fixed image in a header area 112 and fixed text in areas 114 and 116. The image and text objects are also utilized to designate an area of a page for reproduction of variable information. For example, after an image object is selected, a box 118 is defined by the user to specify an image location on the page 110. Defining the box 118 may be accomplished by first selecting the image object with a pointer, moving the pointer to a position on the page 110 to select the position by a mouse click or otherwise, and then sizing the box 118 by moving the pointer to another position. The user then designates the box 118 as a variable information area (via a task bar command or otherwise), which results in a reference image (e.g., a uniform background color) being placed into the box 118. The reference image may comprise any image, inasmuch as it merely signifies that the box 118 has been designated as a variable information area. The user is then provided (via a dialog window or otherwise) with an opportunity to designate a placeholder name for a variable image placeholder <xauto> for the box 118. The placeholder name preferably corresponds with the database field name to be associated with the variable image placeholder. Alternatively, the field name and the placeholder are associated by the user. In either case, data indicative of the database field name is stored in the template file, together with data indicative of the position of the object on the page 110.

Following the foregoing steps, other processing of the variable image box 118 may then be performed. For instance, the user may select a display format such as "fit-to-box" or the like, and proceed with any formatting necessitated thereby.

The creation of a general text box 122 on the page 110 will now be described, the text box 122 being "general" in the sense that it may include both fixed and variable information. After a pointer is used to select a text object, the text box 122 on the page 110 is defined using the pointer to select a position on the page 110 from which the pointer is moved (i.e., dragged) to size the text box 122 at the desired location. Variable and/or fixed text information may then be placed into the box 122 using the pointer to select the box 122 as well as particular cursor positions within the box 122. For example, as seen in FIG. 5, the fixed text "See the new" may be typed into the box 122 after selecting a cursor position with the pointer. This fixed information is then followed by the name of a variable information placeholder <xtype>. The placeholder name is preferably demarcated in some fashion to distinguish the placeholder from the fixed information. In this example, the characters "< >" demarcate the placeholder name.

Placeholder names may not be demarcated, but rather highlighted via formatting or distinguished from fixed text by matching the name to a list of placeholders stored in connection with the page 110. In this regard, it is helpful to identify placeholders with names that would not be typically used in the fixed text portions of the page 110 (e.g., xtype).

As used herein, a variable information placeholder refers to any placeholder associated directly or indirectly with variable information. Furthermore, a variable information placeholder may be associated with variable information in the form of a database entry, a file, or any other collection of information without regard to the actual location or structure of the variable information.

As further described hereinafter, the variable information placeholder xtype in the text box 122 designates a variable text area within the text box 122. Data representative of the position of the variable text area is stored in the template file 80 together with data representative of the name of the placeholder designating the variable text area. The position of each variable text area, however, is often a relative position on the page to be printed, in the sense that the final position of the variable text area on the printed page may be determined by the text incorporated into other placeholders in the same text box.

With continued reference to FIG. 5, another general text box 124 defined by the user includes both the fixed information "Dear" and the name of a variable information placeholder <xname>, together with the names of two additional variable information placeholders <xstory1>, <xstory2>. More particularly, each of the placeholders <xstory1> and <xstory2> is a text file placeholder, which is a type of variable information placeholder that associates a variable text area with fields in the database 82, each of which stores data representative of one or more names of variable text files 102. The data stored in the variable text files 102 is then used to incorporate variable information into the variable text area for the page to be printed.

Each variable text file 102 generally comprises data representative of textual and/or formatting information, as well as variable information placeholders. For example, the text file placeholder <xstory1> may be associated with a database field name varstory1. The data stored in the database 82 under this field name may be representative of one or more names of variable text files 102, such as carsearch and carsale. The data stored in these variable text files 102, in turn, may be representative of the following textual information and variable information placeholders:

carsearch

I realize that you are beginning a search for a new <xtype>. What an exciting time! I am interested in helping, so why don't you stop by and see if I can get you behind the wheel of a brand, new <carfont> <xyourcar>.

carsale

I realize that in the next few days you will be purchasing a new <xtype>. What an exciting time! I am interested in helping, so why don't you stop by to test drive the brand, new <carfont> <xyourcar>.

The general text box 124 may include any number of text file placeholders to designate any number of variable text areas therein. Accordingly, the position of any text file placeholder is associated with, but should be distinguished from, the final position of the variable text areas on the page. In the above example, the position of the variable text associated with the second text file placeholder <xstory2> will depend upon the nature of the information associated with the text file placeholder <xstory1>. As a result, the position of any particular variable text area on the page may be a function of (i.e., related to) the placement and position of other information on the printed page.

Alternatively, the general text box 124 may include a single text file placeholder that refers to a database entry that calls (i.e., identifies) multiple variable text files 102 for a page to be printed.

In the foregoing carsearch example of a variable text file 102, the data stored therein includes a variable information placeholder <carfont> that may be associated with database entries having formatting codes and related information such as a font name and the like. In this manner, the information stored in the database 82 may constitute control information in the interest of varying the appearance of text provided within the variable information area 124.

Continuing with the example of FIG. 5, the text file placeholder <xstory2> may be associated with a database field name varstory2. The data stored in the database 82 under this field name may be representative of one or more names of variable text files 102, such as "bobend" and "timend." The data stored in these variable text files 102, in turn, may be representative of the following textual information:

bobend

Sincerely, Bob

P.S. Go Wildcats!

timend

Yours truly,

Tim

P.S. It was a pleasure meeting you.

Preferably, the names of the text file placeholders signify that the variable textual information will be provided via one of the variable text files 102. For instance, in the example above, each text file placeholder name contains the text string "story" for that purpose. If the placeholders are consistent in such a manner, the placeholders can be easily identified without relying on demarcating punctuation.

Each of the above-described objects on the page 110 may then be modified via formatting commands and the like. That is, at any point during the page makeup process, other functional aspects of the QuarkXPress® software may be invoked as necessary to produce finished pages.

Once the user determines that no more objects are to be added, the resulting template file(s) 80 are stored in a memory or other storage medium as set forth hereinabove. Eventually, the template file(s) 80, the database 82, the variable image files 100, and the variable text files 102 are preferably downloaded or otherwise transferred to the control unit 32 for processing in accordance with programming executed by the processor 35 of the control unit 32. However, the creation of the files and/or the processing according to the software routine may be accomplished in a distributed manner, such as via an Internet, intranet, or other network. In any event, the programming includes one or more routines for generating the master page files 86, 88, the variable page files 92, 94, 96, 98, and the press command file 109 from the files 80, 82, 100, and 102.

Figure 6A:
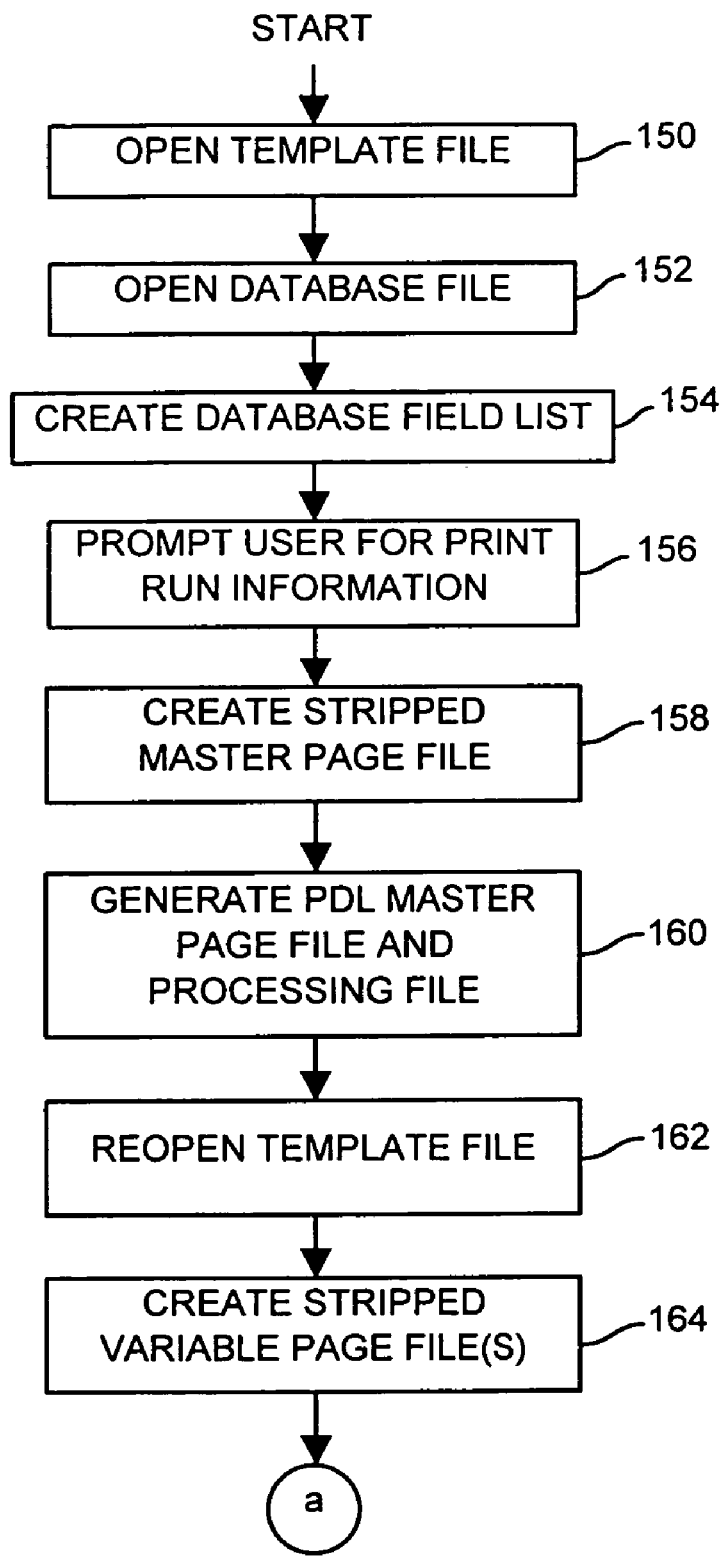
FIGS. 6A-6E, when joined along similarly-lettered lines, together represent programming executed by the control unit 32 of FIG. 2 to implement one aspect of the present invention.
Figure 6B:
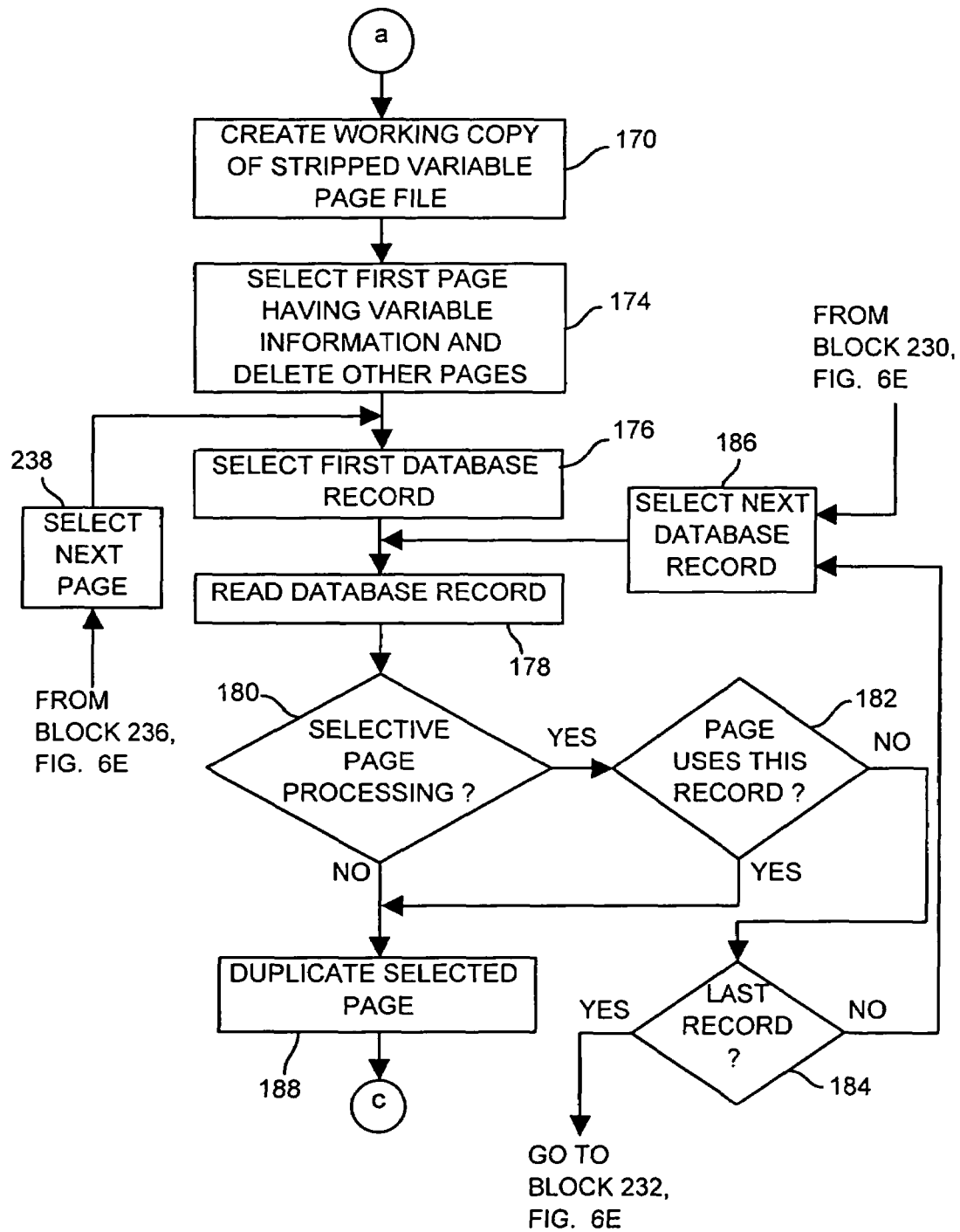

The programming is set forth in detail in FIGS. 6A-6E. Referring first to FIG. 6A, a block 150 prompts a user to select a template file, such as the template file 80, which is then opened. A block 152 then prompts a user to select a database file, such as the database 82, and the selected database file is opened. A block 154 accesses the database field names of the selected database 82 and stores them in a list for later reference. The user is then prompted by a block 156 to enter print run information indicating a section number, whether pages are to be printed in simplex (i.e., single-sided) or duplex (i.e., double-sided) format, a file storage location, and other like information. The section number identifies the order in which multiple sections are to be processed for a book, particularly when the book is quite long. For example, a long book may include a plurality of chapters wherein each chapter is represented by a separate template file and the chapters are concatenated to produce the entire book. In such cases, the section numbers are utilized to specify the order or sequence of the chapters.

Lastly, the user may also be prompted to enter a selective processing code identifying a particular book version to process if multiple versions are to be produced during a single press run.

Next, a block 158 generates the stripped master page files 84 from the template file 80 in accordance with the programming set forth in the above-referenced U.S. patent. Briefly, the block 158 first checks the name of each image on each page against the field name list to determine whether the image is a variable image, in which case the image is deleted. If the image name is not on the field name list, then the image is not deleted. Once all of the images have been evaluated, the block 158 parses and evaluates each text box on each page to determine whether the text box includes any placeholders for variable text. The field name list is once again consulted to determine whether the text box includes either a variable information placeholder or a text file placeholder. If the text box contains either of such placeholders, the text box is deleted by the block 158. If neither placeholder type is found, the text box is not deleted. Upon completing the processing for all objects on each of the pages, a block 160 converts the stripped master page file into a PDL master page file. The block 160 also generates a processing file (e.g., *.INI file) in accordance with the teachings of the above-referenced U.S. patent. Each processing file establishes printing parameters, such as page size, cut sheet size, offset, orientation, output file, copy count, and other information related to the printing of the PDL master page file.

Following the block 160, a block 162 then reopens the same template file originally opened by the block 150 to begin the process of creating the stripped variable page file(s) 90 of FIG. 4. A block 164 evaluates each image and text box on each page in light of the field name list to determine whether the object contains variable information. Objects having only fixed information are deleted by the block 164. On the other hand, when the object is of the variable type, the block 164 identifies and saves data representative of the object location on the page, any fixed text information, any placeholder names, the relative position of any placeholders, and any other associated characteristics. In connection with any placeholders, the block 164 also saves data representative of the database field name(s) associated with a placeholder in the object. Still further, the block 164 preferably establishes a counter for tracking the number of text objects having placeholders and another counter for tracking the number of variable image objects.

After all the pages have been processed and the stripped variable page file(s) have been created, a block 170 creates a working copy of the stripped variable page file(s) 90. A first page having variable information thereon is selected, and data representing the remainder of the working copy of the file 90 is then deleted by a block 174. Following the block 174, a block 176 selects a first record in the database 82 and a block 178 reads the record. An optional block 180 checks to determine whether a selective processing code has been entered by the user indicating that the page is to undergo selective page processing. As noted above, the system may be utilized to produce not only books of a single version (i.e., where corresponding pages differ only in terms of the variable information stored in the database), but also books of different versions. In the latter case, the books of different versions may have different fixed and/or variable information. The fixed and/or variable information may vary in terms of content and/or appearance (i.e., style, location, rotation, position, etc.) in different versions.

If the block 180 finds that selective page processing is to be undertaken, then a block 182 determines whether the database record read by the block 178 is utilized on the page currently under consideration. If this is not the case, a block 184 checks to determine whether the record currently under consideration is the last in the database. If so, control passes to a block 232 of FIG. 6E. Otherwise, a block 186 selects a next record in the database 82 and control returns to the block 178 where the next database record is read.

If the block 180 determines that selective page processing is not to be undertaken, or if the block 182 determines that the record read by the block 178 is used in the page currently under consideration, a block 188 duplicates the data representing the page remaining after execution by the block 174 to initiate development of one of the files 92 or 94. In the first pass through the program of FIGS. 6C and 6D, and in connection with the example of FIG. 4, the block 188 creates the file 92, develops page data representing the first page P1-*a* and adds further variable information to such page data during immediately succeeding passes through the program. Thereafter, data representing the remaining pages P1-*b*, P1-*c* and P4-*a* through P4-*c* is created and variable information is added to such pages during subsequent passes. These steps are initiated by a block 190 which processes each image box (if any) by retrieving the image file identified by the associated field of the current database record. The block 190 also performs any scaling or other processing that has been selected by the publisher. Further information on the processing of variable image boxes may be found in the above-referenced U.S. patent. Once the block 190 determines that all image boxes have been processed, a block 192 checks to determine whether there are any text boxes on the page and, if so, a pair of blocks 194, 196 select a first text box and a first placeholder therein, respectively.

Once a placeholder is selected, a block 198 determines whether the placeholder is a text file placeholder by determining whether a predetermined string is recited in the placeholder name. Other schemes for distinguishing between placeholder types, such as those based on certain punctuation or other demarcating parameters, may be used as should be evident to those skilled in the art. If the placeholder is not a text file placeholder, control passes to a block 200, which inserts variable text data stored in the database 82 for the current record into the variable text area designated by the variable information placeholder in the text box. Once the variable text data has been inserted into the text box, the block 200 recomposes all text in the text box so that the text obtains a neat, finished appearance. The recomposition process is automatically undertaken by the QuarkXPress® program as the variable text is inserted into each text box. Alternatively, the recomposition process may be performed once it is determined that all variable text has been inserted into the text box.

If the block 198 determines that the placeholder is a text file placeholder, the current database record is accessed to determine which text file should be associated with the text file placeholder, as well as to process the text file accordingly in the event that the text file contains one or more placeholders embedded therein. Initially, a block 202 accesses a list stored in run-time or other memory (such as the memory 33) to determine whether the text file identified by the associated field of the current record has been processed previously. The list may include data representative of an identification of each such file or an identification of a related file associated therewith, as will be explained further hereinbelow.

If the text file has not been processed previously, control passes to a block 204 (FIG. 2D) that generates an associations file for the specified text file. As will be described in greater detail in connection with FIGS. 7A and 7B, the first time a text file is encountered, an "associations file" is generated to pair each variable information placeholder within the text file with a respective field in the database. If the text file has already been processed (i.e., the associations file has already been generated), the associations file is opened by a block 206 (FIG. 2C) for processing together with a copy of the text file itself, which is opened by a block 208.

Instead of relying upon a run-time list as described above, the block 202 may initiate a search of the run-time or other memory to determine whether the associations file exists, which is indicative of whether the text file has been processed previously.

Once the associations file is either generated or opened, a block 210 (FIG. 2D) selects the first line of the associations file. The data contained on that line, in turn, is indicative of one of the variable information placeholders within the text file and a database field name. Assuming that the placeholder is not a text file placeholder, a block 212 selects the placeholder identified in the associations file, and a block 214 modifies the text file by replacing the placeholder name with data representative of the variable text stored in the database in the associated field of the current record. A block 216 then determines whether the last line in the associations file has been processed. If not, the next line is selected by a block 218, and control returns to the block 212. Otherwise, the text file has been modified to the extent that it no longer contains any data representative of variable information placeholder names, and a block 220 inserts this modified text file into the variable text area designated by the text file placeholder in the general text box. Blocks 222 and 224 then close the associations file and the text file without saving the modified copies, thereby retaining an unmodified version of the text file for processing in connection with other database records.

Upon completing the processing for a particular variable text area, a block 226 checks the text box currently being considered to determine whether any further placeholders remain therein. If another placeholder remains, control returns to the block 198 (FIG. 6C) to determine whether the placeholder is a text file placeholder. If the next placeholder is a text file placeholder, the above-described processing once again occurs to generate a modified text file and incorporate the data stored therein into the general text box. If the next placeholder is not a text file placeholder, control passes to the block 200 and the variable page processing continues thereafter as described hereinabove. If no placeholders remain, the incorporation of variable information into the general text box is complete, and control passes to a block 228 to determine whether any further text boxes remain on the page. If another text box needs to be processed, control returns to the block 196 (FIG. 6C) for selection of the first placeholder thereof. If no other text boxes remain, the programming required to produce one of the portions of the variable page file 96 of FIG. 4 is complete. Control then passes to a block 230 (FIG. 6E) to determine whether all records in the database 82 have been processed. If further records remain, control returns to the block 186 (FIG. 6B) for selection of the next database record. If the last record has been processed, control passes to a block 232 that generates the variable PDL files 104, 106, together with the processing files therefor. A block 234 then checks the stripped variable page file 90 to determine whether the last page has been processed. If not, control passes to a block 236 that creates another working copy of the stripped variable page file 90 for processing of the next page, which is selected by a block 238. All other pages are then accordingly deleted by the block 238 and the routine proceeds as set forth hereinabove.

Once all pages have been processed, control passes to a block 240 that generates a press command file 109 (if necessary) in accordance with the teachings of the above-referenced U.S. patent. The resulting press command file 109 contains a sequence of press commands that cause printing of pages in a desired order. An optional imposition system may then be performed by a block 242, which modifies the press command file 109 and page files, as set forth in the above-referenced U.S. patent. Lastly, a block 244 converts the variable page files 96, 98 or the imposed variable page files 104, 106 into bitmap format. In accordance with the print system 60 of FIG. 3, the block 244 is preferably executed using the RIP 66.

Nested Variable Text File Processing

Each variable text file may include any type of variable information placeholder, including any number of text file placeholders. That is, a variable text file may include one or more placeholders that result in nested variable text files. Accordingly, the programming associated with the processing of each variable information placeholder preferably incorporates a recursive algorithm that provides for such nested variable text files.

The processing of nested variable text files will now be described in connection with the template page 110 of FIG. 5. During the implementation of the programming directed to generating the variable page files 96, 98, the processing of the text file placeholder <xstory1> results in a call-out to a variable text file that has one or more further text file placeholders therein. For instance, instead of the variable information placeholder <xtype>, the variable text file carsearch may include a text file placeholder <xtypestory>. It shall be understood that the nesting of placeholders may continue indefinitely, such that, for instance, those variable text files called by the text file placeholder <xtypestory> may, in turn, include further text file placeholders.

Figure 6C:
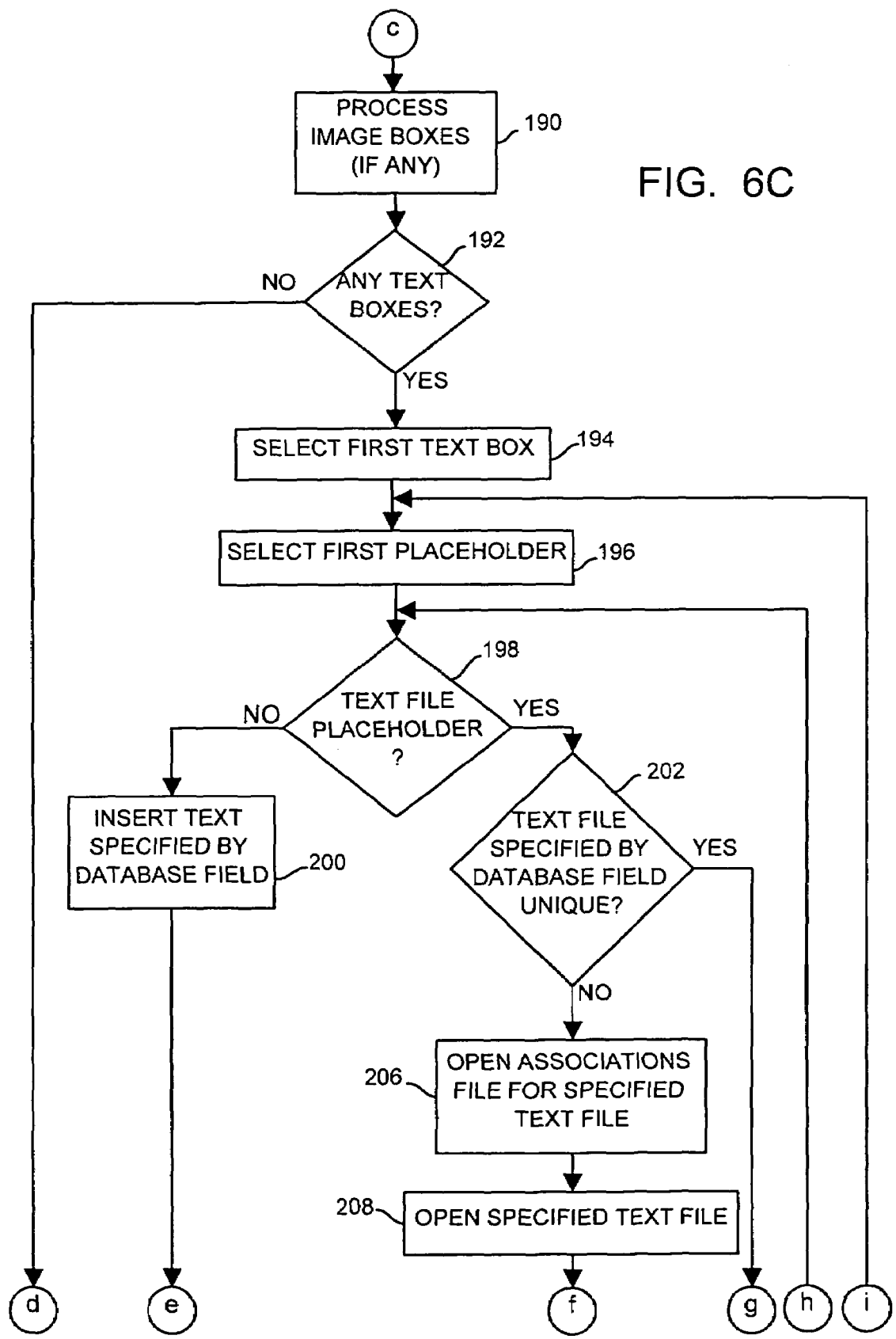
Figure 6D:
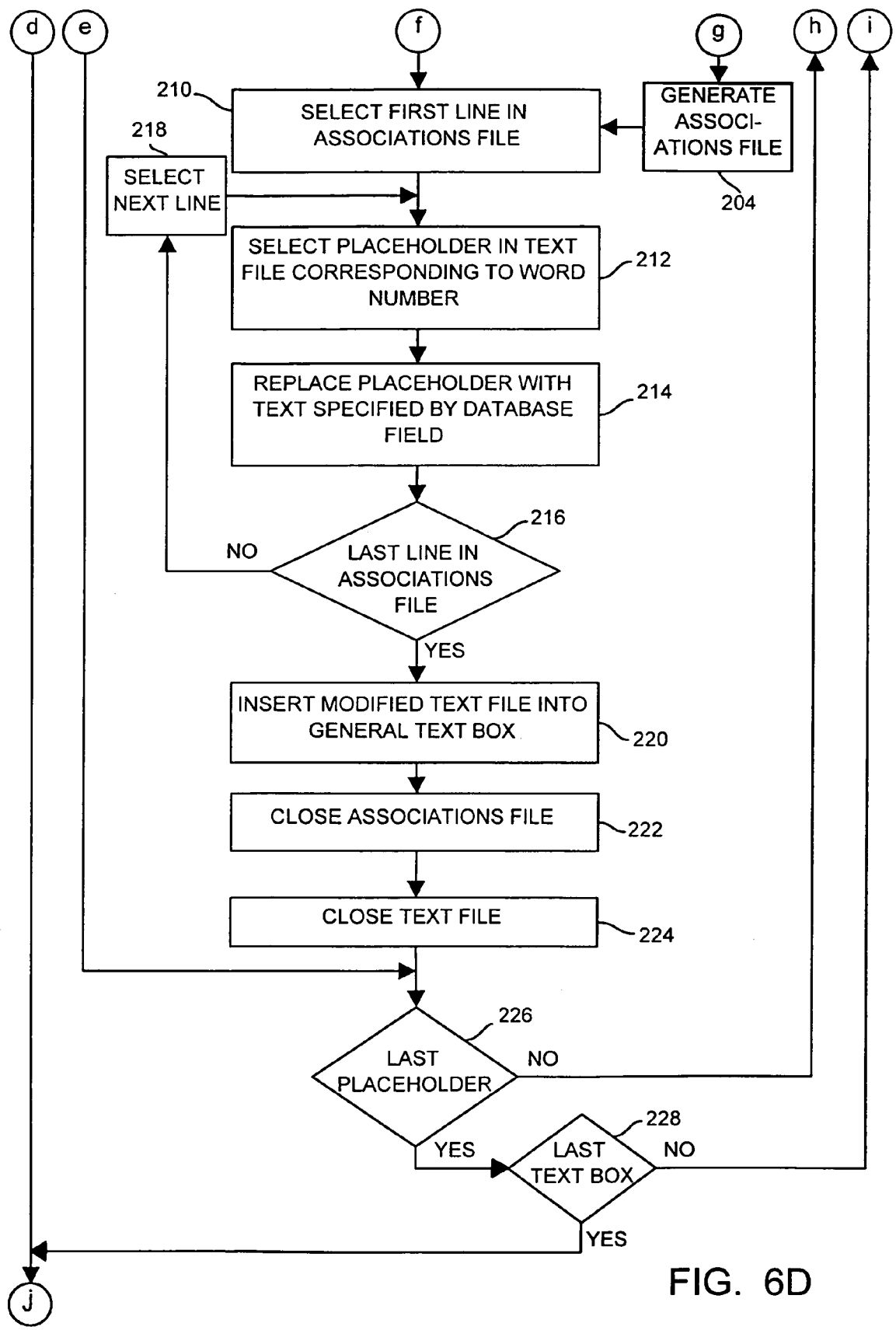
Figure 6E:
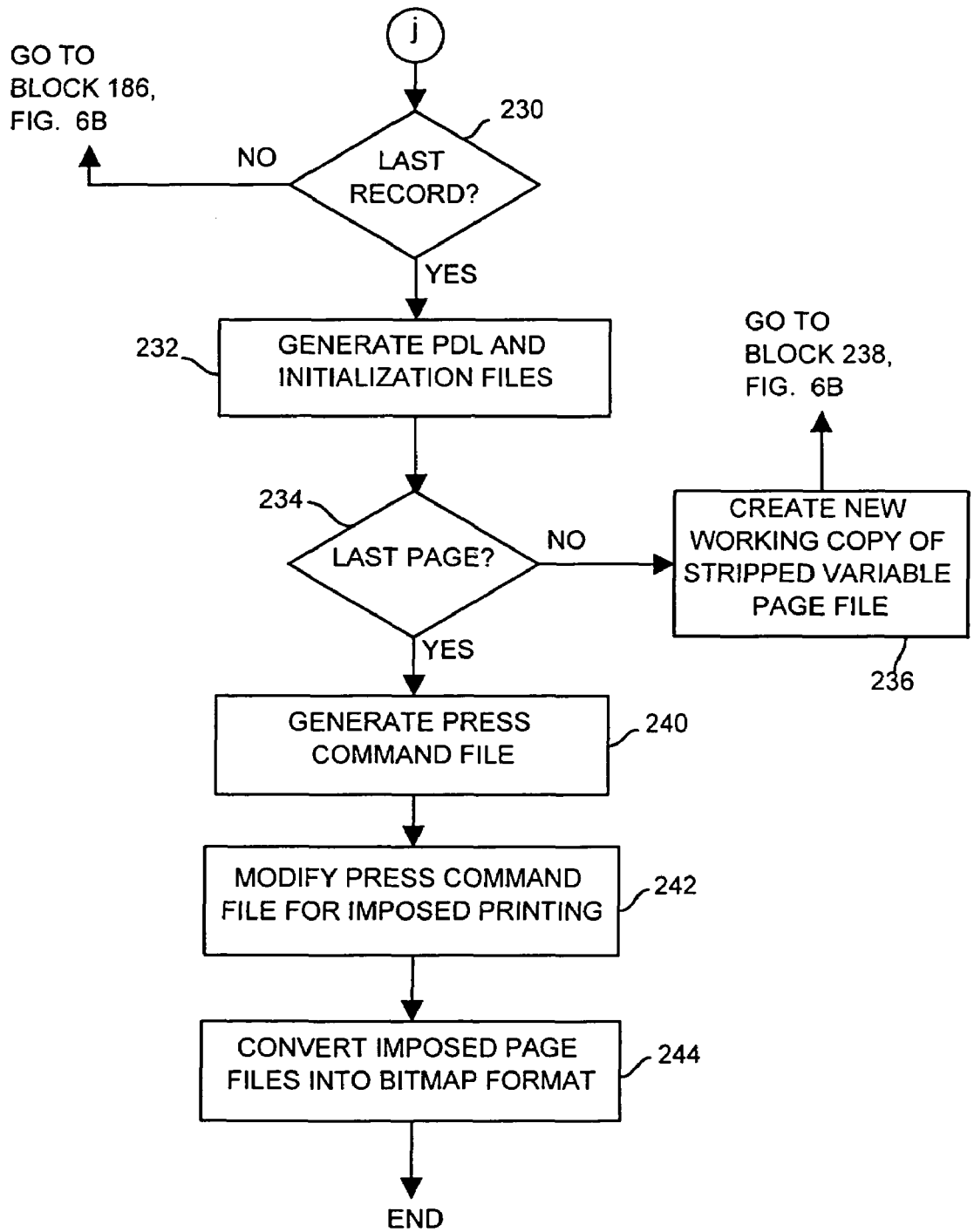

In an exemplary embodiment, after the associations file is either generated or opened, and the first placeholder in the variable text file is selected by the block 212 (FIG. 6D), the placeholder name may be analyzed to determine whether the placeholder is a text file placeholder. This analysis may conform substantially to the process performed in the block 198 (FIG. 6C) and may include a search for a particular textual string or demarcation indicative of a text file placeholder. If the placeholder name is indeed indicative of a text file placeholder, a routine similar to that shown in the blocks 202 through 216 of FIGS. 6C and 6D is executed to generate a modified variable text file in accordance with the current record of the database 82. The modified text file may then be inserted into the variable text file currently being modified in accordance with the block 220.

In an alternative embodiment, the associations file generated for each variable text file may include data indicative of whether the placeholder is a text file placeholder, as described hereinafter.

Associations File Generation

Figure 7A:
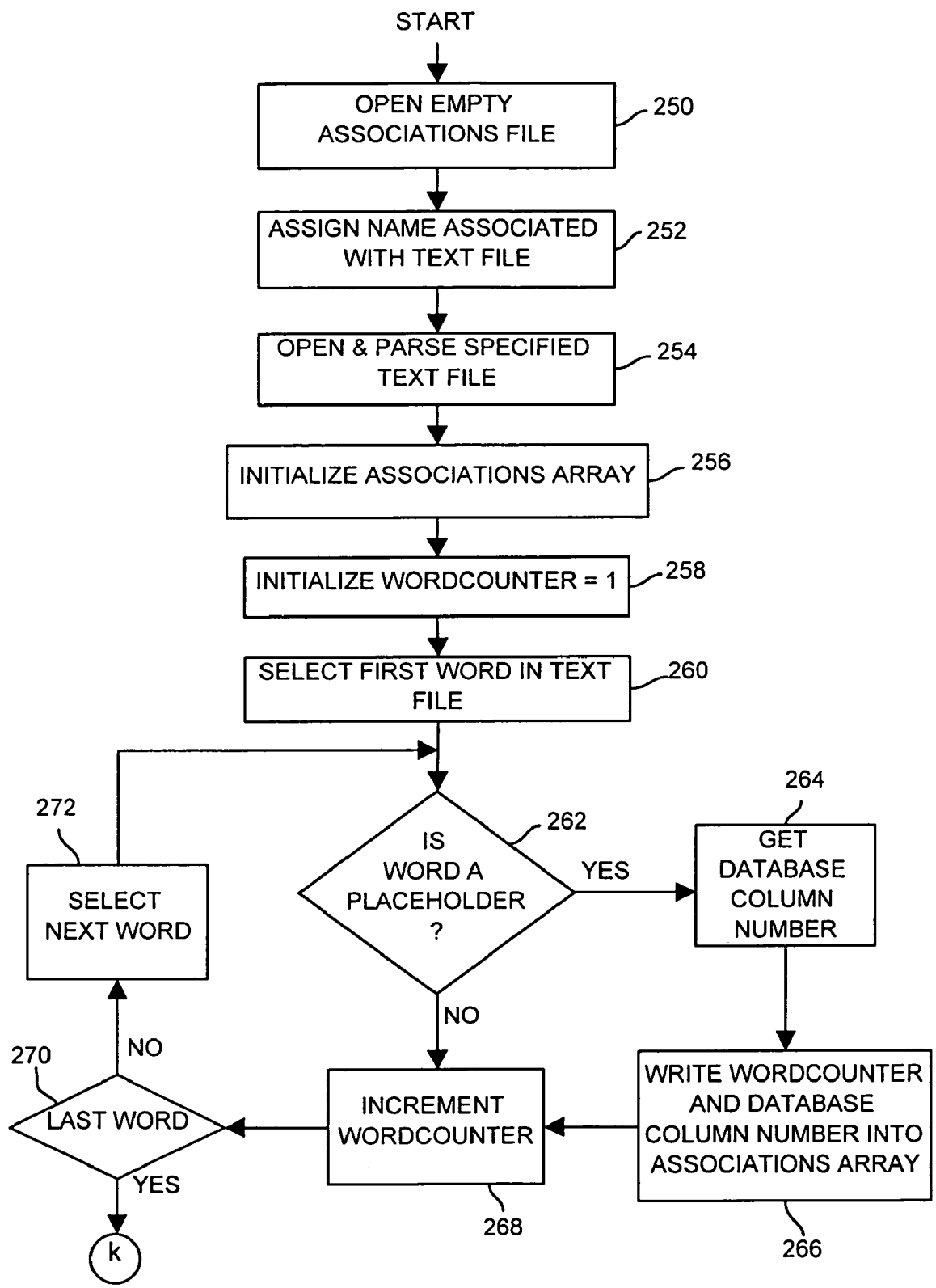
FIGS. 7A-7B, when joined along similarly-lettered lines, together represent programming executed by the control unit 32 of FIG. 2 to implement another aspect of the present invention.
Figure 7B:
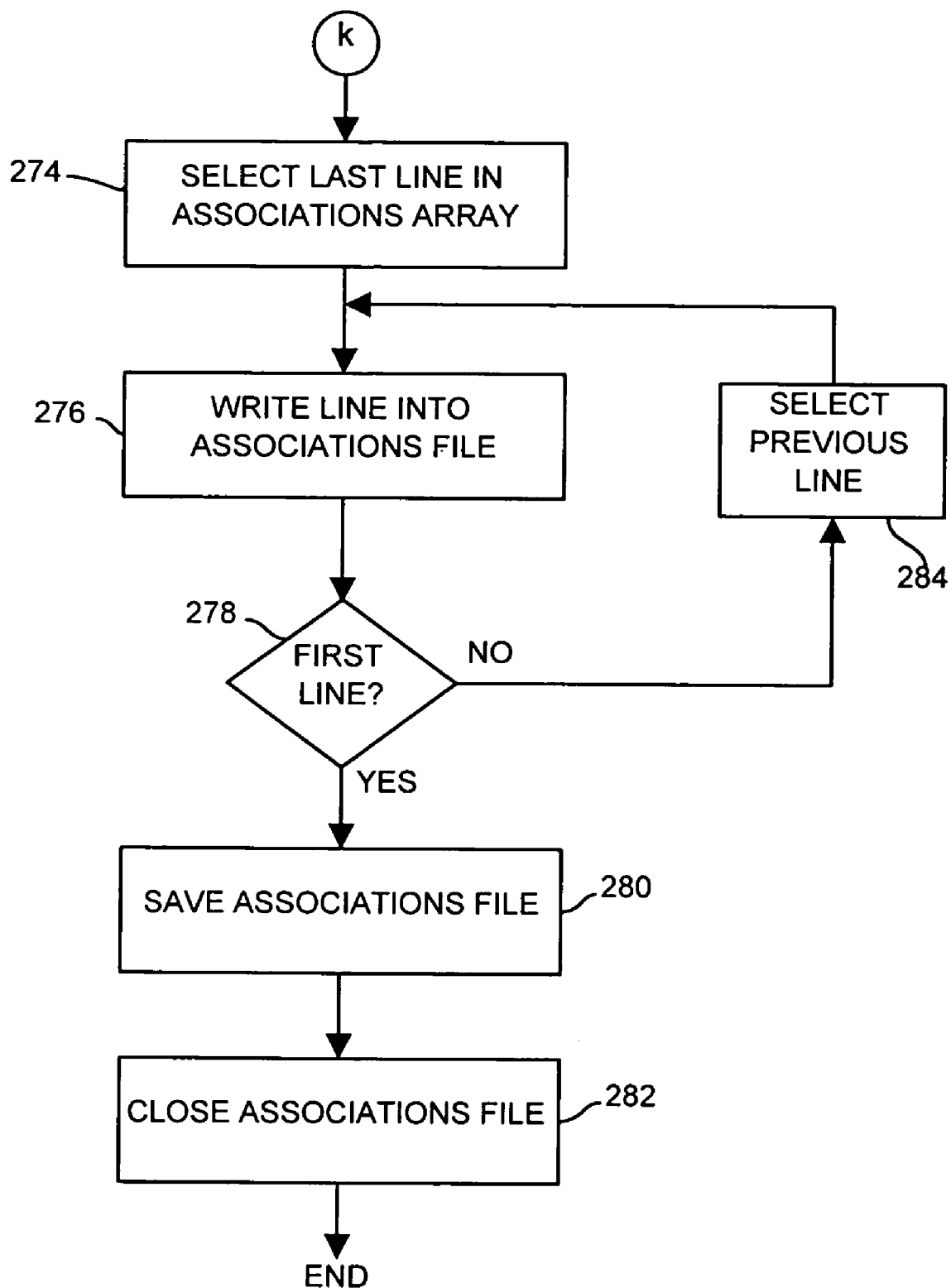

FIGS. 7A-7B show the programming executed by the control unit 32 in connection with the block 204 (FIG. 6D) in greater detail. Specifically, generation of an associations file for each variable text file referenced in the database 82 begins in a block 250 that opens an empty associations file. The associations file may be set forth in any file format, such as ASCII. A block 252 then assigns a name to the empty associations file in accordance with the name of the variable text file. For example, the associations file name for the text file carsearch may be carsearch.vars, wherein the .vars extension is indicative of an associations file.

Following the block 252, the text file referenced in the database 82 is opened, read into a memory, and parsed by a block 254. Next, blocks 256 and 258 initialize a two-dimensional array and a variable wordcounter in memory, respectively, with the variable wordcounter being preferably initially set to 1. The first word of the referenced text file is then selected by a block 260, and a block 262 determines whether the word is a placeholder. This determination may be made in a variety of ways, and may involve a predetermined demarcation as set forth hereinabove (e.g., < . . . >), a search for particular punctuation, and the like. At this time, a determination may also be made as to which type of placeholder has been encountered in the event that nested variable text files are a possibility.

If the word is a variable information placeholder, control passes to a block 264, which accesses the database 82 to retrieve the database column number associated with the field name identified by (or otherwise associated with) the placeholder. A block 266 then writes the current value of the variable wordcounter and the database column number into the two-dimensional array. In one embodiment, if the word is a text file placeholder, the block 266 may also enter some character or code indicative of a text file placeholder. If the word is not a placeholder, or once the values (and/or codes) are written into the array, a block 268 increments the variable wordcounter by 1. A block 270 then checks the text file to determine whether the current word is the last word, and passes control to a block 272 for selection of the next word in the event that the end of the text file has not yet been reached. Otherwise, the text file has been completely analyzed and, accordingly, the array comprises a list of all of the variable information placeholders in the text file, together with an indication of the database field name with which they are associated. As noted above, the array may also comprise other control codes.

Once the array is complete, the information stored therein is provided to the empty associations file. To this end, a block 274 selects the last line in the array, and a block 276 writes the line into the associations file. Thereafter, a block 278 determines whether the entire array has been processed. If the current line is the first line of the array, then control passes to a block 280, which saves the associations file in accordance with the file name established by the block 252. To complete the routine, a block 282 then closes the associations file. If the first line of the array has yet to be reached, control passes to a block 284 for selection of the previous line of the array, and further processing in accordance with the block 276.

The above-described programming results in an associations file that contains database association data for each placeholder in the text file in reversed order. The reversed order of the association data, in turn, causes the programming relying upon each associations file to process the variable text file starting with the end thereof. In this manner, the word count in the variable text file is not altered each time variable information is incorporated therein and, consequently, the text file is correctly modified by the variable information.

In an alternative embodiment, a variable text file 102 may include variable information placeholders for the insertion of one or more images therein. The particular image to be inserted is identified via the same processing described above in connection with the template files 80. Because the image would be inserted into a variable text area, such an embodiment may include programming steps directed to automatic reflow of the text within the variable text area. Such automatic reflow capability is, in fact, provided via the aforementioned QuarkXPress® software. In the event that a system utilizing the present invention does not include such actions, the embodiment may include "fall-back" programming that provides an optional presentation of information in lieu of the variable image. Such information could include a textual message regarding the error or failure, a textual description of the image or action, or a hyperlink (or hyperlink information) related to the image or action.

It should be noted that the above-described text files and templates may include data representative of a hyperlink to an audio, video, or other file. Such hyperlink data may, in fact, be representative of the textual information identifying the hyperlink, or instead be indicative of the textual information as well as the data necessary to establish the hyperlink to the remotely located data.

It should be noted that a placeholder may be represented by any type of data in any format, and should not be limited to any particular type of character notation, symbol, or coding. Furthermore, a placeholder need not be referenced by a placeholder name, and alternative schemes for identifying and/or referring to placeholders may be utilized.

As used herein, the term "text file" shall be understood to refer to any discrete storage or collection of data representative of textual (i.e., non-image) information outside of any template file or database. As a result, a text file shall be understood to include textual data that has not been formally saved as a file, but may be collectively provided in any manner to the control unit 32 for processing in accordance with the present invention. Furthermore, a text file is not limited to any particular file format, but more generally may comprise any type of representation of textual information. Still further, a "file", as used herein, should be understood to include any collection, grouping, or assembly of data regardless of whether the data is stored in a local, remote, or distributed manner.

It should be understood that the above-described programming is not limited to any particular software implementation, and, accordingly, may be embodied in hardware, firmware, or any other computer-readable medium. In the event that the programming is implemented in software, however, it may be stored in any form on any computer-readable medium. A computer-readable medium, in turn, includes any medium (or number of media) capable of being accessed by a computer, regardless of whether the medium is localized, remotely located, or distributed (i.e., via a network, Internet or intranet) in nature.

A memory, as used herein, shall be understood to include any number of computer-readable storage media capable of storing data, whether volatile or nonvolatile, including but not limited to ROM, RAM, EPROMs, or any magnetic or optical media such as portable and fixed disks.

The foregoing detailed description has been given for clearness of understanding only, and no unnecessary limitations should be understood therefrom, as modifications would be obvious to those skilled in the art.

What is claimed is:

1. A software system for generating multiple page files from a template file and records in a database wherein the template file comprises data designating a variable text area, comprising:
a computer-readable medium; and
a software program stored in the computer-readable medium and including
a first routine that selects records from the database;
a second routine that associates the variable text area with text files designated by entries in the selected records, wherein each entry designates a storage location remote from the database and wherein the text files comprise variable information placeholders;
a third routine that generates the multiple page files from the template file, the text files, and the database, wherein each selected record determines the content of each page file and wherein each page file corresponds to each selected record; and
a fourth routine that derives further text files from the first-named text files in accordance with the variable information placeholders and at least one of the record entries.

2. The software system of claim 1, wherein a fifth routine generates the multiple page files from the further text files.

3. The software system of claim 1, wherein the fourth routine modifies the first-named text files to derive the further text files.

4. The software system of claim 3, wherein:
the record entries are stored in the database under a plurality of field names;
the software program further includes a fifth routine that generates an associations file having association data linking one of the plurality of field names with the variable information placeholders.

5. The software system of claim 4, wherein:
the variable information placeholders have word positions in the text files; and
the association data is representative of the word positions of the variable information placeholders.

6. The software system of claim 1, wherein the multiple page files comprise variable data files.

7. The software system of claim 6, wherein the variable data files comprise page description data readable by an electronic press to print books.

8. The software system of claim 1, wherein the record entries further specify control information, and wherein the control information comprises the number of page files to be produced and formatting information for the page file to be produced.

9. A software system for generating multiple page files from a template file and records in a database wherein the template file comprises data designating a variable text area, comprising:
a computer-readable medium; and
a software program stored in the computer-readable medium and including
a first routine that selects records from the database;
a second routine that associates the variable text area with text files designated by entries in the selected records, wherein each entry designates a storage location remote from the database; and
a third routine that generates the multiple page files from the template file, the text files, and the database, wherein each selected record determines the content of each page file and wherein each page file corresponds to each selected record; and
wherein the variable text area is designated by a text file placeholder, the record entries are stored in the database under a plurality of field names, and a storage location of the text files is specified by data stored under one of the plurality of field names associated with the text file placeholder.

10. A method of generating multiple page files from a template file and records in a database wherein the template file comprises data designating a variable text area, the method comprising the steps of:
   selecting records from the database;
   associating the variable text area with text files designated by entries in the selected records, wherein each entry designates a storage location remote from the database and wherein the text files comprise variable information placeholders;
   generating the multiple page files from the template file, the text files, and the database, wherein each selected record determines the content of each page file and wherein each page file corresponds to each selected record; and
   deriving further text files from the first-named text files in accordance with the variable information placeholders and at least one of the record entries.

11. The method of claim 10, wherein the generating step comprises the step of processing the template file to include further data stored in the further text files.

12. The method of claim 10, wherein the deriving step comprises the step of modifying the first-named text files.

13. The method of claim 12, wherein:
   the record entries are stored in the database under a plurality of field names;
   the method further comprises the step of generating an associations file having association data linking one of the plurality of field names with the variable information placeholders.

14. The method of claim 13, wherein:
   the variable information placeholders have word positions in the text files; and
   the association data is representative of the word positions of the variable information placeholders.

15. The method of claim 10, wherein the multiple page files comprise variable data files.

16. The method of claim 15, wherein the variable data files comprise page description data readable by an electronic press to print books.

17. The method of claim 10, wherein the record entries further specify control information, and wherein the control information comprises the number of page files to be produced and formatting information for the page file to be produced.

18. A method of generating multiple page files from a template file and records in a database wherein the template file comprises data designating a variable text area, the method comprising the steps of:
   selecting records room the database;
   associating the variable text area with text files designated by entries in the selected records, wherein each entry designates a storage location remote from the database; and
   generating the multiple page files from the template file, the text files, and the database, wherein each selected record determines the content of each page file and wherein each page file corresponds to each selected record; and
   wherein the variable text area is designated by a text file placeholder, the record entries are stored in the database under a plurality of field names, and a storage location of the text files is specified by data stored under one of the plurality of field names associated with the text file placeholder.

19. An apparatus for generating multiple page files from a template file and records in a database wherein the template file comprises data designating a variable text area, the apparatus comprising:
   means for selecting a record from the database;
   means for associating the variable text area with a text file designated by an entry in the record, wherein the entry designates a storage location remote from the database and wherein the text file comprises a variable information placeholder;
   means responsive to the associating means for generating a page file of the multiple page files from the template file, the text file, and the database, wherein each selected record determines the content of each page file and wherein each page file corresponds to each selected record; and
   means for deriving a further text file from the first-named text file in accordance with the variable information placeholder and at least one of the record entries.

20. The apparatus of claim 19, wherein:
   the record entries are stored in the database under a plurality of field names; and
   the apparatus further comprises means for generating an associations file having association data linking one of the plurality of field names with the variable information placeholder.

21. The apparatus of claim 19, wherein:
   the variable text area is designated by a text file placeholder;
   the record entries are stored in the database under a plurality of field names; and
   a storage location of the text file is specified by data stored under one of the plurality of field names associated with the text file placeholder.

22. The apparatus of claim 19, wherein the record entries further specify control information, and wherein the control information comprises the number of page files to be produced and formatting information for the page file to be produced.

23. A software system for generating multiple page files from a template file and records in a database wherein the template file comprises data designating a variable text area, comprising:
   a computer-readable medium; and
   a software program stored in the computer-readable medium and including
   a first routine that selects a record from the database;
   a second routine that associates the variable text area with a first text file designated by an entry in the record, wherein the first text file includes a variable information placeholder;
   a third routine that derives a second text file from the first text file in accordance with the variable information placeholder and at least one of the record entries; and
   a fourth routine that generates a page file of the multiple page files from the template file, the second text file, and the database, wherein each selected record determines the content of each page file and wherein each page file corresponds to each selected record.

24. The software system of claim 23, wherein the page file comprises a variable data file.

25. The software system of claim 24, wherein the variable data file comprises page description data readable by an electronic press to print books having variable content.

26. The software system of claim 23, wherein:
   the record entries are stored in a database under a plurality of field names;

the first text file includes a further variable information placeholder;

the first-named and further variable information placeholders have a respective word position in the text file; and the third routine associates the first-named and further variable information placeholders with corresponding database field names of the plurality of database field names and develops array data representative of the respective word position of the first-named and further variable information placeholders and the corresponding database field names.

27. The software system of claim 26, wherein the third routine generates a file comprising the array data stored in reverse order.

28. The software system of claim 23, wherein:

the variable text area is designated by a text file placeholder;

the record entries are stored in a database under a plurality of field names;

a storage location of the text file is specified by data stored under a field name of the plurality of field names associated with the text file placeholder.

29. The software system of claim 28, wherein the template file includes further data representative of a general text area having the variable text area therein.

30. The software system of claim 29, wherein the general text area comprises a further text file placeholder.

31. The software system of claim 23, wherein the variable information is representative of formatting codes for text in the modified text file.

32. The software system of claim 23, wherein:

the software program further includes a fifth routine that determines whether the variable information placeholder is a text file placeholder.

33. The software system of claim 23, wherein the software program further comprises a fifth routine that prompts a user to establish a storage location of the database.

34. The software system of claim 23, wherein:

the record entries are stored in a database; and the database further comprises data identifying a storage location of the text file.

35. The software system of claim 23, wherein the record entries further specify control information, and wherein the control information comprises the number of page files to be produced and formatting information for the page file to be produced.

36. A method of generating multiple page files from a template file and records in a database wherein the template file comprises data designating a variable text area, the method comprising the steps of:

selecting a record from the database;

associating the variable text area with a first text file designated by an entry in the record wherein the first text file includes a variable information placeholder;

deriving a second text file from the first text file in accordance with the variable information placeholder and at least one of the record entries; and generating a page file of the multiple page files from the template file, the second text file, and the database, wherein each selected record determines the content of each page file and wherein each page file corresponds to each selected record.

37. The method of claim 36, further comprising the step of determining whether the variable information placeholder comprises a text file placeholder.

38. The method of claim 36, wherein the record entries are stored in a database under a plurality of field names.

39. The method of claim 38, wherein:

the variable information placeholder has a word position in the text file; and the associating step comprises the step of storing data representative of the word position and one of the plurality of field names.

40. The method of claim 36, wherein the record entries further specify control information, and wherein the control information comprises the number of page files to be produced and formatting information for the page file to be produced.

41. A system for generating multiple page files, comprising:

a first memory that stores a template file comprising first data designating a text file placeholder;

a second memory that stores second data representative of variable information;

a third memory that stores a plurality of text files wherein each text file comprises a respective plurality of variable information placeholders, and wherein the third memory is stored remotely from the first and second memories; and a processor coupled to the first memory, second memory, and the third memory and configured to perform:

a first task that associates the text file placeholder with a first text file of the plurality of text files, wherein the first text file includes a variable information placeholder;

a second task that derives a second text file from the first text file in accordance with the variable information placeholder and at least one of the data representative of variable information; and a third task that generates a page file of the multiple page files from the template file, the second text file, and the second data, wherein each second data determines the content of each page file and wherein each page file corresponds to each second data.

42. The system of claim 41, wherein the second memory stores third data specifying the first text file of the plurality of text files.

43. The system of claim 41, further comprising a computer-readable medium that includes the first memory, second memory, and the third memory.

44. The system of claim 41, wherein at least one of the plurality of variable information placeholders comprises a further text file placeholder.

45. The system of claim 41, wherein the second memory stores third data specifying a storage location of the third memory.

46. The system of claim 41, wherein the record entries further specify control information, and wherein the control information comprises the number of page files to be produced and formatting information for the page file to be produced.

* * * * *